(12) United States Patent
Tripp et al.

(10) Patent No.: US 6,182,610 B1
(45) Date of Patent: *Feb. 6, 2001

(54) ANIMAL CONFINEMENT SHELTER WITH ACCELERATED DECOMPOSITION OF WASTE

(75) Inventors: Herman W. Tripp, Paton, IA (US); Jerry R. Tripp, Beaver, UT (US); Clara F. Tripp, Paton, IA (US)

(73) Assignee: The One Step Corporation, Paton, IA (US)

( * ) Notice: Under 35 U.S.C. 154(b), the term of this patent shall be extended for 0 days.

This patent is subject to a terminal disclaimer.

(21) Appl. No.: 09/332,816

(22) Filed: Jun. 14, 1999

Related U.S. Application Data

(63) Continuation-in-part of application No. 08/848,513, filed on Apr. 28, 1997, now Pat. No. 5,911,195.

(51) Int. Cl.[7] ............................................... A01K 1/00
(52) U.S. Cl. .................................................... 119/450
(58) Field of Search ................................ 119/450, 502, 119/503, 508

(56) References Cited

U.S. PATENT DOCUMENTS

| | | | |
|---|---|---|---|
| 3,875,319 | * 4/1975 | Seckler et al. | 426/431 |
| 3,881,024 | * 4/1975 | Pahoundis, Sr. et al. | 426/578 |
| 3,910,775 | * 10/1975 | Jackman | 44/13 |
| 3,955,536 | * 5/1976 | Bunger | 119/28 |
| 4,018,899 | * 4/1977 | Seckler et al. | 426/55 |
| 4,193,873 | * 3/1980 | Thrasher | 210/170 |
| 4,208,279 | * 6/1980 | Varani | 210/12 |
| 5,911,195 | * 6/1999 | Tripp et al. | 119/450 |

* cited by examiner

*Primary Examiner*—Thomas Price
(74) *Attorney, Agent, or Firm*—Brian J. Laurenzo; Michael C. Gilchrist

(57) ABSTRACT

The one-step system of the present invention provides a highly sanitary, efficient, economical and humane method for raising pigs from birth to finished product. Farrowing and raising pigs in just one location helps to reduce virus and bacteria problems as compared with conventional methods and significantly reduces labor costs. As a result, the mature hog is healthier and also more profitable. By slowing composting fibrous material and manure on-site, the waste management system of the one-step system completely eliminates the need for offensive lagoons, and recycles the manure for end products useful in gardening and agricultural applications.

37 Claims, 19 Drawing Sheets

//ANIMAL CONFINEMENT SHELTER WITH ACCELERATED DECOMPOSITION OF WASTE

This application is a continuation-in-part of application Ser. No. 08/848,513, filed Apr. 28, 1997, now U.S. Pat. No. 5,911,195.

BACKGROUND OF THE INVENTION

1. Field of the Invention

The present invention relates to hog operations, and in particular to a one-step farrow to finish hog operation, including waste management and recycling.

2. Background of the Art

The hog is a domesticated mammal belonging to the swine family and is extensively raised in almost every part of the world as a food animal. Although the term "pig" by definition refers to a young swine, it is also commonly used worldwide to refer to a male or female swine of any age. A young female swine is referred to as a gilt until the first farrow, after which the animal is referred to as a sow. Hogs are well-adapted for the production of meat because they grow and mature rapidly. Furthermore, hogs have a relatively short gestation period of about 114 days and a sow typically produces nine (9) to eleven (11) offspring with each litter.

There are more than 90 breeds of hogs recognized today, differing in growth rate, litter sizes, mature body size, and so forth. In the United States, most commercial hog production is based on crossbred animals, and the animals are grown under more intensive conditions than cattle and sheep.

The three principle types of hog operations are: Production of purebred breeding stock, production of feeder pigs, and growing and finishing of feeder pigs for sale and slaughter. Some producers have formed cooperatives and raise hogs for all three purposes, building large farrowing units where as many as 1,000 sows can give birth. After the feeder pigs are weaned, the individual members of the cooperatives typically buy them back for feeding and finishing. The confinement of so many hogs in just one farrowing unit, however, leads to problems with virus and bacteria buildup. Furthermore, each time the hog is moved, it must adjust to the bacteria in the new location, before it can continue to grow efficiently. Other operations may breed and grow hogs for all three purposes on one site, but separate the areas or buildings where farrowing, weaning, growing, and finishing take place. Again, such relocations may help to overcome the problems associated with virus and bacteria buildup, but the repeated adjustments the hog must make in each new location reduce growing efficiency, and increase labor costs as well.

In order to raise healthy and profitable hogs efficiently, care must also be given to the selection of feeds, temperature and facility size. Often the feeders themselves are difficult to keep clean, not only adding to labor costs, but increasing the chances for contamination of the feed. Newborn pigs are also very sensitive to cold, and often some type of heat is provided to warm the pigs when the temperature drops. Some conventional pig warmers, however, keep the newborn pigs at the belly of the sow where they can be pulled under and smothered or crushed when the mother pig rolls onto her belly. It is also important to ensure that pigs are kept cool enough, since they have no sweat glands, and can easily overheat in warm conditions.

Adequate ventilation is also extremely important in removing toxic gases such as ammonia and hydrogen from waste products. Inadequate ventilation can not only be deadly for the pigs, but also for humans who breathe the toxic air. One current type of ventilation system uses natural air flow which is initiated by opening the peak of the roof so that the hot air escapes through the opening, and pulls air in from the open sides. The open sides can also be closed when necessary with a suitable covering. This system works fairly well in some climates, but not in northern or extreme southern climates where temperature extremes are common. Another well-known ventilation method utilizes large fans on one end of a building for drawing air from the other end of the building through a water-cooled fibrous material. A similar system pulls air through a plastic air tube which typically extends the length of the building and has holes through which the air is blown. These types of systems work best in dry climates and on dry days when evaporation can cool the air. When the air is saturated with water during humid conditions, however, there is less evaporation, and therefore less cooling. Although more adequate cooling and movement of the air is typically achieved with the methods which use fans, all of the above-described ventilation systems allow air to flow uncontrolled throughout the building and directly onto the hogs. This problem is not reduced with the use of wire mesh panels to separate the hogs in their pens, as air easily passes through the open fencing onto the hogs. Such drafty conditions can lead to discomfort and possible ill-health for the hogs.

A proper farrowing pen is also important in providing adequate comfort for the sow, as well as comfort and safety for the newborn pigs. The use of solid concrete or heavy metal wire mesh for flooring, however, leads to problems with bacteria build-up. Specifically, bacteria can grow and multiply in the pores of the concrete and on the surface of the wire mesh. Although applying a sealant can reduce this problem to some extent in the case of concrete flooring, this only increases labor and material costs. In the case of heavy wire mesh flooring, the metal often rusts, exacerbating problems with bacteria build-up. Further-more, the heavy wire mesh flooring itself is uncomfortable for the pigs, and the wires can cut their feet.

A farrowing pen having a heated area in the floor to attract young pigs away from their mother is taught in U.S. Pat. No. 3,181,503 to Tripp, which is hereby incorporated by reference. Other features of the farrowing pen in Tripp include a design wherein there is a separate stall within the pen having fixed partitions to restrict the sow's movement. In this way, the baby pigs still have access to the sow for nursing, but the sow cannot encroach on the young pigs' area and possibly harm them. Furthermore, the sow can relieve herself in just one area. The pen flooring in Tripp is comprised of a poured concrete flooring (covered with a metal floor plate) and removable T-irons located over gutters. The use of a T-shaped iron for grating allows excrement to be more easily pushed by the hogs through to the gutter below. It is now well-known, however, that T-irons cannot be kept clean and entirely free of contaminants, as they typically rust through from the inside after only a few months' time, even when a sealant has been applied. Tripp also teaches the use of feeders which reduce waste and encourage the young pigs to supplement their mother's milk, thus enabling pigs to be weaned sooner. Although such improvements in hog management have provided some increased comfort and better nutrition for the pigs, the problems of bacteria and virus buildup still exist, as well as continuing problems with high labor costs.

Further, current waste control methods do not always adequately manage the waste, resulting in operations which are unsanitary, smelly, and costly to operate. Some operations still simply manually push the pig waste to a desired location. Other operations, as described in Tripp, use slats (which are typically concrete or metal) in one area of the pen in an attempt to control waste by collecting it directly from the hog and allowing it to fall or be pushed by the hogs into deep pits or gutters located below. Those operations using the heavy wire mesh flooring throughout the pen also collect waste in underground pits. If the pits are too deep, however, the manure is not "digested" or decomposed quickly, leading to odor problems. Further, water is commonly added to the manure, tending to dilute the natural bacterial action which otherwise helps to decompose the manure.

Current outdoor lagoons built to handle overflow manure and to separate the solids fraction are typically several feet deep, which again results in a slowing down of the natural bacterial action. This can lead to an increase in offensive odors due to the many chemical reactions taking place in the lagoons. Such lagoons, particularly for large hog operations, are not only unpopular, but cause adverse environmental impact as well. Specifically, toxic leachates and their associated volatile organic compounds as well as offensive inorganic gases and vapors emanating from such lagoons are a major source of atmospheric pollution. Further, economically-important materials such as nitrogen and sulfur which are contained in the toxic off-gases are being wasted. It is well-known that the method in which manure is handled not only impacts the profitability of a livestock operation, but also impacts significantly on the environment, including the overall health of the livestock and caretakers.

In U.S. Pat. Nos. 3,875,319 and 4,018,899 to Seikler, et. al., a process and apparatus for recovering feed products from animal manure with the use of successive liquid and solid separation stages are taught. This complex process is a batch process in which the manure is transported to the apparatus for treatment. Water and sometimes chloride are also added to kill bacteria. Although this system is reusing manure, it does not teach any improved method for managing or recycling manure on-site at a livestock operation, as it suggests manually scraping manure from the pens.

Thus, what is needed is a sanitary, efficient, humane, and economical system in which to raise and farrow hogs, in which virus and bacteria build-up is reduced, the exposure of newborns to various bacteria and viruses is limited, and manure is adequately controlled to reduce odors and protect the environment.

SUMMARY OF THE INVENTION

The present invention provides a sanitary, efficient, humane and economical system in which pigs are born and raised in one location. The improved system eliminates the hazards of moving growing hogs (pigs) from one area to another and controls waste efficiently and effectively, thus reducing labor costs considerably. The waste management system of the present invention allows pig waste to be composted on a continuous basis under or near a hog facility which is producing the waste. This system not only helps the environment by completely eliminating the need for lagoons in hog operations, but also protects the environment by recycling pig waste and returning to the environment natural and necessary nutrients needed in agriculture and gardening.

The process and apparatus of the present invention is unlike conventional methods in which pigs are born into huge farrowing stalls or into a farrowing stall having conventional metal or concrete slats for flooring. The present invention provides for sows to be housed in traditionally-sized pens. The pens of the present invention, however, are preferably non-porous to protect the pigs and caretakers from uncomfortable air drafts. Just prior to farrowing, the sow is placed in an adjustable and removable farrowing stall having an end bar to prevent excessive backward movement of the sow. The farrowing stall is preferably comprised of side bars or side "panels" and front and back vertical support pipes which can be attached at various heights to deckplate. The adjustable side panels function to restrict the sow's movement and protect the young pigs from their mother. The pen floor underneath the deckplate and throughout the pen has slats preferably made from fiberglass T-bars which do not rust, corrode, or promote bacterial or viral growth.

In a preferred embodiment, a heated pig hover also having deckplate as flooring is created with a fiberglass or aluminum cover in a corner away from the farrowing stall to lure the young pigs away from their mother in between feedings. In this way, the young pigs are kept warm and clean, yet are not at risk of being crushed or smothered. A feeder can also be located in the pig hover. When the pigs are more active, the farrowing stall is removed, and the sow and young pigs are allowed to move about freely in the pen. After the young pigs are weaned, the sow is removed to another facility, allowing the young pigs to continue to grow in the same pen. The one-step system of the present invention eliminates hazardous and time-consuming moves for the growing pigs, eliminates the necessary adjustment to new contaminants in each new facility, and reduces labor costs as well.

The building is also provided with adequate and comfortable ventilation and cooling through the use of a jet stream cooling system, in conjunction with the non-porous pen partitions. Unlike conventional ventilation and cooling systems having a water-cooled fibrous "wall" through which the air passes, the jet stream cooling system of the present invention receives fresh air into a water-cooled "cooling room" created by porous curtains which can be raised or lowered as the temperature or humidity warrant. The cooling room contains a suitable water-cooled porous material which cools the incoming air flowing across it by evaporation. The cooled air from the cooling room is then drawn by fans located above the pens down through a plenum, i.e. plenum chamber, which is attached to the cooling room. The plenum chamber, which extends the full length of the building, has slots designed to control air flow so that the air moves across the top of the solid pen partitions, and out through the exhaust fans. The ventilation and cooling process is preferably controlled, in part, by one or more thermostats and/or one or more humidistats located nearby. In this way, the flow of air through the building is completely controlled, such that there are no dead air spaces for undesirable and potentially dangerous gases to collect.

The water for the cooling room is preferably provided from elevated onsite water tanks located in the cooling room itself. The water is then pumped from the tanks into trays having holes such that the water trickles out through the trays onto the porous material in the cooling room.

The sow and young pigs are preferably fed using one or more feeders comprised of an adjustable fiberglass or aluminum feeder panel which fits into a set of slots or channels in two adjacent walls of the pen, creating a feeding area. One feeding area is preferably in front of the farrowing stall and the other feeding area can be in the pig hover. Water for the sow and the young pigs to drink and/or be sprinkled with when necessary, is preferably supplied from the above-described elevated tanks. In this way, the water flows by gravity through a piping system and out through suitable nipples located inside the pens, or out through sprinklers as needed. The elevated tanks of the present invention eliminate the need for the drinking and sprinkler water to be pumped, thereby eliminating the dependence on outside power for this portion of the operation.

The present invention also includes a waste control system which first collects pig waste in a gutter system located below the pens, and then transports it through removal of a plug, through an opening, and into one or more underground holding tanks. The pig waste is then sprayed into one or more bin blending conveyors housed within a bin having fibrous material such as ground corn stalks or sawdust. The pig waste and fibrous material mixture combine to form a ground fibrous waste material or mash which is preferably transported up and down the length of the building by a pair of gutter blending conveyors located in central gutters below the service alley between two rows of pens. The mash is moved along by the gutter blending conveyors at a speed sufficiently slow so that composting can occur on a continuous basis. In one embodiment, the gutter blending conveyors turn on and off periodically.

The end product can then be tested for content to determine whether it is more suited for use as fertilizer, potting soil or other agricultural or gardening product. It is possible, with appropriate additives, for the end product to have even more varied uses, including as livestock feed.

The apparatus and process of the present invention is sanitary, economical, humane, and highly efficient, resulting in healthy and highly profitable pigs as well as by-products useful in farming and gardening.

These and other features, aspects, and advantages of the present invention will become better understood with regard to the following description, examples, appended claims and accompanying drawings.

DETAILED DESCRIPTION OF THE INVENTION

Farrowing and raising pigs in just one location not only helps to reduce virus and bacteria problems as compared with conventional methods, the one-step system of the present invention is a highly sanitary, efficient, economical and humane method for raising pigs which will also reduce labor costs considerably. Not only is the mature pig healthier and thus more profitable, the labor-saving and environmentally-friendly waste management system of the present invention allows pig waste to be composted continuously on-site, resulting in profitable end-products useful in gardening and agriculture.

Figure 1:
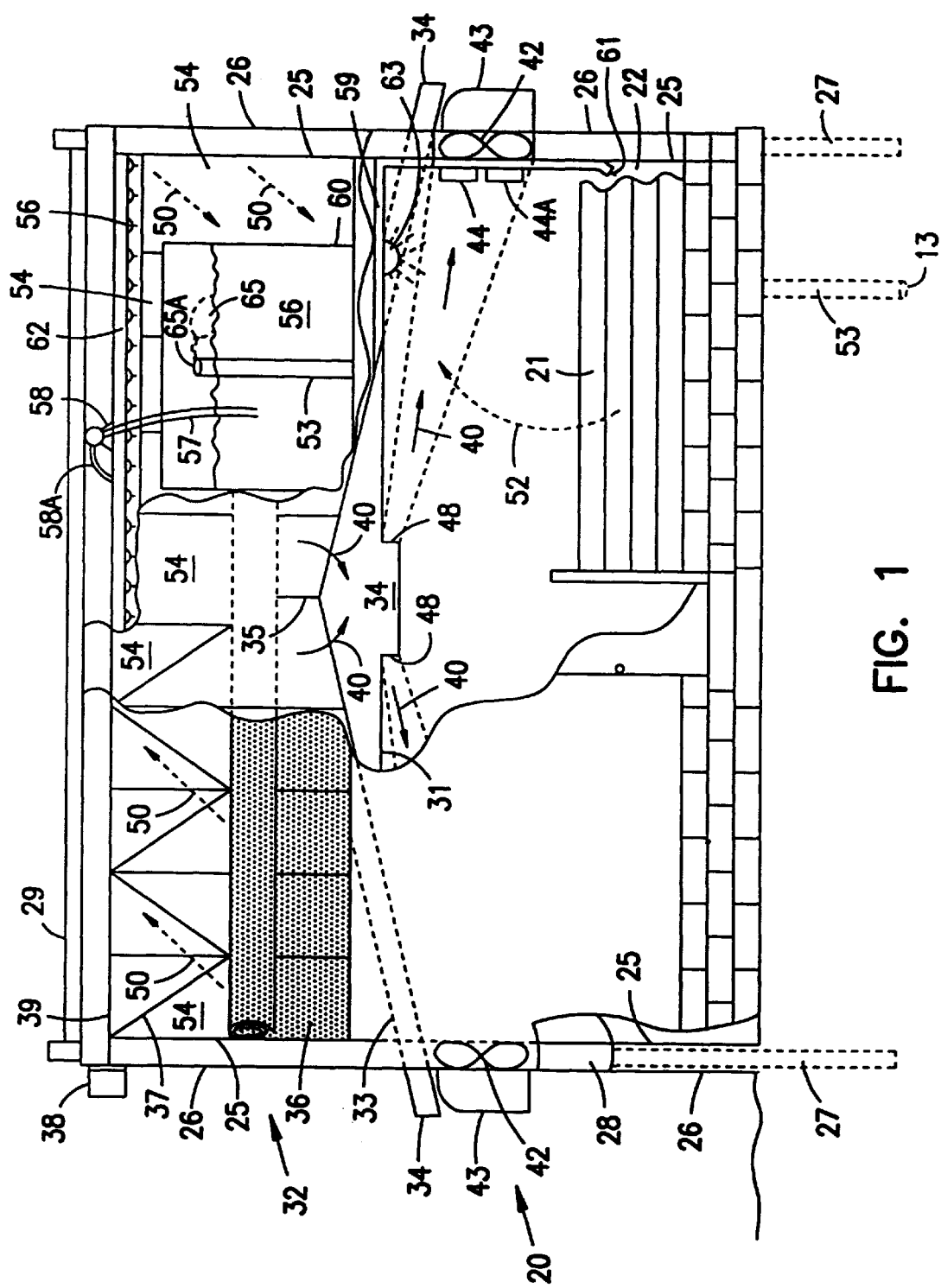
FIG. 1 is a cut-away end view of one end of a building with a jet stream cooling and ventilation system in one embodiment of the present invention.

As shown in FIG. 1, the present invention includes a building 20 or a series of buildings 20 housing any suitable number of pens 22 which have walls or partitions 21. The building or buildings 20 can be constructed from at least one thickness of any suitable material, including wood, aluminum or steel. In a preferred embodiment, the interior wall 25 is comprised of plywood, about 1.6 cm (0.625 inches) thick. This interior wall 25 preferably has a fiberglass cover, preferably about 90 gauge, to protect the material (such as plywood) from the animals within. The exterior wall 26 is preferably comprised of another layer of plywood about one (1) cm (0.375 inches) thick. The exterior wall 26 is preferably covered with aluminum or plastic to protect the material such as plywood from the elements. Preferably the space 28 between the interior and exterior walls 25 and 26, respectively, is filled with suitable insulation, such as foam or fiberglass insulation having an R factor of about 12 to 18, to aid in keeping the interior adequately climate controlled. The preferred embodiment is easily constructed and is virtually impervious to rust and corrosion, as well as viruses and bacteria. Further, this preferred embodiment is washable and extremely long lasting.

Near the center section of the building 20 there are preferably support elements such as two poles 27 on either side of the building, for a total of four poles 27, two of which are shown in FIG. 1. The poles 27 create the four corners of a service center 30 (shown in FIG. 2) and the four corners of a "cooling tower" or cooling room 32 described below. The poles 27 can be made from any suitable material and be of any size sufficient to adequately provide support to the cooling room 32. In one embodiment, the poles are preferably wooden timbers about 15 cm by 15 cm. (six [6] in. by six [6] in.) in width and depth and about 5.5 meters (18 ft.) in length, with about 0.6 meters (two [2] ft.) of this length extending below ground. The poles 27 are located in the space 28 in which insulation is otherwise present. The poles 27 are preferably located such that they are covered on the outer side by the exterior wall 26 and on the inner side by the interior wall 25.

The building 20 has a roof 33 which is partially covered by the cooling room 32 in the center area of the building 20. The roof 33 is constructed of a suitably strong material such as suitably-sized wooden timbers which are about five (5) cm. by 15 cm (two [2] in. by six [6] in.) spaced about 0.6 meters (two [2] ft.) apart. The roof 33 can be finished in any conventional manner which meets construction standards for the climate in which the building 20 is located. For example, the roof 33 can be finished with tar paper and shingles or a suitable type of metal covering. In a preferred embodiment, the roof 33 is covered with corrugated steel which can be overlapped such that water cannot penetrate through to the interior of the building 20. The roof 33 is preferably sloped such that excess water can flow over the corrugated steel and out over the eaves 34. Although any suitable shape and pitch of roof 33 can be used, the preferred building 20 has a low profile roof 33 with eaves 34 extending beyond the exterior walls 26 of the building 20. The ceiling 31 is preferably made from a waterproof material such as plastic sheets or even fiberglass. The ceiling 31 is preferably relatively flat and can be any suitable height. The roof 33 and eaves 34 are of any suitable height and angle to form a peak 35. In one embodiment the ceiling height is about two (2) meters (7.5 feet), the eave height is about two (2) meters (6 feet), the and the peak height is about three (3) meters (9 feet).

Over the top of the cooling room 32 is a cooling room cover 29. The cooling room cover 29 can be made from any suitable material such as tar or metal, and is located such that it protects the top of the cooling room 32 from the elements. Preferably the cooling room cover 29 is relatively flat or slightly sloped as shown in FIG. 1, so that rain and snow can drain out through a suitable nearby opening or gutter. The ends of the cooling room 32 can be protected from the elements by the same interior wall 25 and exterior wall 26 as described above having the space 28 between which can be filled with insulation. In such an embodiment, as shown in FIG. 1, the interior and exterior walls 25 and 26, respectively, do not end at the roof 33, but extend beyond to cover the ends of the interior of the cooling room 32. Alternatively, the ends of the cooling room 32 can be protected with the same type of curtains 36 which protect the sides of the cooling room 32 as described below.

Adequate ventilation is also very important to a successful hog operation. Although any suitable ventilation system can be employed in the present invention, preferably a climate controlled ventilation system is used having a suitable number of exhaust fans 42 located on one side or both sides of the building 20 preferably under fan hoods 43. In the embodiment shown in FIG. 1, one exhaust fan 42 is shown on each side of the building 20. More preferably, the ventilation system utilizes a cooling room 32 located on top of the building 20, which provides cool air directly into a plenum chamber 34 running the length of the building 20 in the center near the ceiling.

The cooling room 32 may be, for example, located above the building 20 outside of the roof 33, but under the cooling room cover 29. More preferably, the cooling room 32 is located near the center of the building 20 over the top of the service center area 30 (shown in FIG. 2) in the building 20. The cooling room 32 is created in part by two or more curtains 36 which serve to protect the contents of the cooling room 32. The curtains 36 are essentially the outer walls or coverings of the cooling room 32 during colder weather and are located on at least two sides of the cooling room 32. The poles 27 discussed above form each of the four corners of the cooling room 32 and provide support for the coverings (which can be curtains 36) used on the sides and on each end of the cooling room 32. As discussed above, the covering for the ends of the cooling room 32 are preferably extensions of the interior and exterior walls 25 and 26, respectively, or more preferably properly-sized curtains 36. FIG. 1 shows the curtain 36 for one side of the cooling room 32.

The curtains 36 wrap or roll around a shaft 39 and can be raised and lowered on cables or ropes 37 operated automatically by a suitable motor 38 which turns the shaft 39 according to a setting on a suitable thermostat 44 and/or humidistat 47A. The curtains 36 can also be pleated such that they are raised and lowered in an "accordion" fashion. In this embodiment, when the curtains 36 are in the lowered position, the pleats are in close proximity to one another such that each pleat is in contact with the pleat above and below. In one embodiment, the motor 38 is a Model No. 506A motor from R & D Equipment Co. in Sioux City, Iowa. Alternatively, the curtains 36 can be raised and lowered manually. Specifically, as the weather cools down by season or at nightfall, the curtains 36 can be raised up as shown in FIG. 1, to partially close off the airflow through the cooling room 32, thus reducing the amount of cooled air 40 which enters the building 20. In contrast, when the weather is warmer, the curtains 36 can be lowered to allow for the maximum amount of air flow through the cooling room 32. The curtains 36 can be made from any suitable material, but are preferably porous which allows a small amount of air to come through the curtains 36 when in use. In one embodiment, the curtains 36 are made from a breathable nylon fabric. The use of a porous material for the curtains 36 prevents cold winds from penetrating the cooling room 32, while allowing enough air to be drawn into the building 20 by the fans 42 below, which are activated by one or more suitable thermostats 44 and/or one or more suitable humidistats 46. The use of porous curtains 36 combined with suitable thermostat and humidistat settings and a low profile building 20 also allows the body heat generated by the animals to provide a portion of the heat for the building 20.

The interior of the cooling room 32 preferably contains one or more layers or rows of suitably porous material 54, with each layer located along an outer edge of the cooling room 32 adjacent and parallel to each of the curtains 36. The porous material 54 is designed to hold water 56 such that fresh air 50 passing over the porous material 54 is cooled by evaporation to become cooled air 40 which then enters the interior of the building 20. Since the porous material 54 is exposed to the elements when the curtains 54 are completely or partially down during warner outdoor temperatures, it is important that the porous material 54 be able to withstand potentially adverse conditions. In a preferred embodiment, an excelsior material or pad is used as the porous material 54. The excelsior pad can be in the form of shavings or cardboard-like material held in place with nylon netting. This type of porous material 54 is less costly than other alternatives and has a longer life. In an alternative embodiment, cooler cells, which are box-shaped cells made of a cardboard-like material which does not deteriorate under moist conditions, can be used as the porous material 54. Cooler cells, however, are considered less efficient than other alternatives such as the excelsior pads. The cooler cells, excelsior material or other suitable porous material can be obtained from any of several sources, but are preferably purchased from R & D Equipment Co. in Sioux City, Iowa.

Water 56 in one or more water tanks 60 is provided from any suitable source. In one embodiment, water 56 is provided from a nearby well 64, and is pumped up from the well 64 through a water pipe 53 as shown in FIG. 1. Preferably the water tank 60 also has some type of level controller such as a float or float controller 65 which controls valve 65A as shown in FIG. 1. Water 56 which is used for the porous material 54 is pumped from each water tank 60 by a suitable water pump 58 through a cooling room pipe 57 into the porous material 54. In one embodiment, each water pump 58 is a small pump having about 1/20 horsepower (HP). One example of this type of pump 58 is the R&D Model No. IP618 pump which can be obtained from R & D Equipment Co. in Sioux City, Iowa. Each water pump 58 can be in any suitable location near their respective tank 60, and is preferably run continuously. In a preferred embodiment, the water 56 is pumped first into an exit line 58A and then into a tray or trough 62 located directly above the porous material 54. The trough 62 preferably has holes located along its length such that the water 56 exits through the holes and trickles to the porous material 54 below. In one embodiment, as shown in FIG. 1, the trough 62 is v-shaped at the top and bottom. In another embodiment, the trough 62 may be v-shaped at the top and also has a pan below for holding excess water which can then be re-circulated through the pump 58. This embodiment can also be equipped with a suitable float in the pan.

The tanks 60 can be in any suitable location, but are preferably located sufficiently high so that water 56 for the pigs to drink can be provided by gravity flow through a suitable water line 59 into each pen 22 and out through the end of the water line 59, preferably through a suitable nipple 61. In a preferred embodiment as shown in FIG. 1, each tank 56 is located inside the cooling room 32 between the two rows or layers of porous material 54. The tank or tanks 60 can be of any suitable size and shape to hold water necessary for cooling and for drinking. In one embodiment, there are two tanks 60 which hold about 1000 gallons each. In this way, there is a large reserve of water 56 in the event of a power outage such that the pigs still have water 56 to drink as described above. In a preferred embodiment, there is also a sprinkler system 63 located above each of the pens 22 which operates by gravity flow and can be used to spray water on the pigs to cool them at any time, including during a power outage.

Preferably the cooled air 40 enters the building 20 through slots 48 in the plenum chamber 34. The slots preferably extend the length of the plenum chamber 34, such that when fresh air 50 is drawn by the fans 42 through the cooling room 32, the resulting cooled air 40 first enters the plenum chamber 34, then exits into the interior of the building 20 through the slots 48. The cooled air 40 is then pulled directly into the fans 42 and outside the building 20. In this way, not only is the cooled air 40 pulled out of the building 20, the toxic or foul air 52 from the floor is also pulled from the building 20. Therefore, the dangerous and toxic gas generated by the animals' waste is removed continuously and there are no "pockets" of dead air or gas anywhere within the building 20. The preferred plenum chamber 34 has slots 48 which are about 3.8 cm to about 6.3 cm. (1.5 in. to about 2.5 in.). If the slots 48 are larger than about six (6) cm, too much cooled air 40 exits near the exhaust fans 42, and not in other more desirable places within the building 20.

In a preferred embodiment, one or more exhaust fans 42 which can have one speed, but preferably more than one speed, such as two speeds or variable speeds, are located in the space 28 between the interior and exterior walls 25 and 26, respectively, above the level of the pens 22 as shown in FIG. 1. Preferably there is about one fan 42 for every three (3) pens 22. In the preferred building size having forty (40) pens 22 as described below, there is a total of twelve (12) exhaust fans 42. Typically, there will be at least one fan 42 operating at all times somewhere in the building 20 so that an adequate vacuum is maintained in each "section", i.e., group of ten (10) pens 22 in the preferred operation. The fans 42 can be any suitable size, but are preferably about 40 cm (16 in.) in diameter. In one embodiment, the fans 42 are model no. PSI 6D-3 fans, purchased from R & D Equipment Co. in Sioux City, Iowa.

As stated above, the fans 42 are controlled in any suitable manner, preferably with a thermostat 44 set such that the lower speed of the fans 42 is activated when the temperature is between about 16° C. to about 21° C. (about 60° F. to about 70° F.), and the higher speed is activated when the temperature is between about 21° C. to about 27° C. (70° F. to about 80° F.).

The actual temperature maintained in the building 20 can be any suitable temperature, but is preferably between about 13° C. to about 27° C. (about 55° F. to about 80° F.), and more preferably between about 16° C. to about 21° C. (about 60° F. to about 70° F.). The selection of the appropriate temperature for the building 20 is dependent on a number of factors, including outside conditions such as humidity, dew point, and so forth, as well as the number and age of pigs located inside the building 20. When very young or newborn pigs are present, the thermostat 44 will be set to turn the fans 42 on at a higher temperature, in order to keep them suitably warm.

In an alternative embodiment, one or more humidistats 46 can be used instead of the thermostats 44. In a more preferred embodiment, the humidistat 46 is used in addition to the thermostat 44 such that the humidistat 46 can override the signal from the thermostat 44 when conditions warrant. The humidistat 46 is preferably set so that a lower speed of the fans 42 is activated when the humidity is between about 50% and about 60%, and a higher speed is activated when the humidity is between about 60% and about 80%. As with the selection of the appropriate temperature, the selection of the appropriate humidity level for the building 20 is also dependent on a number of factors, including the outside temperature, as well as the number and age of pigs located inside the building 20.

In a most preferred embodiment, the partitions 21 of the pens 20 are also solid so that the cooled air 40 flows over the top of the pens 20, and not directly onto the pigs as occurs with conventional wire mesh partitions.

Figure 2:
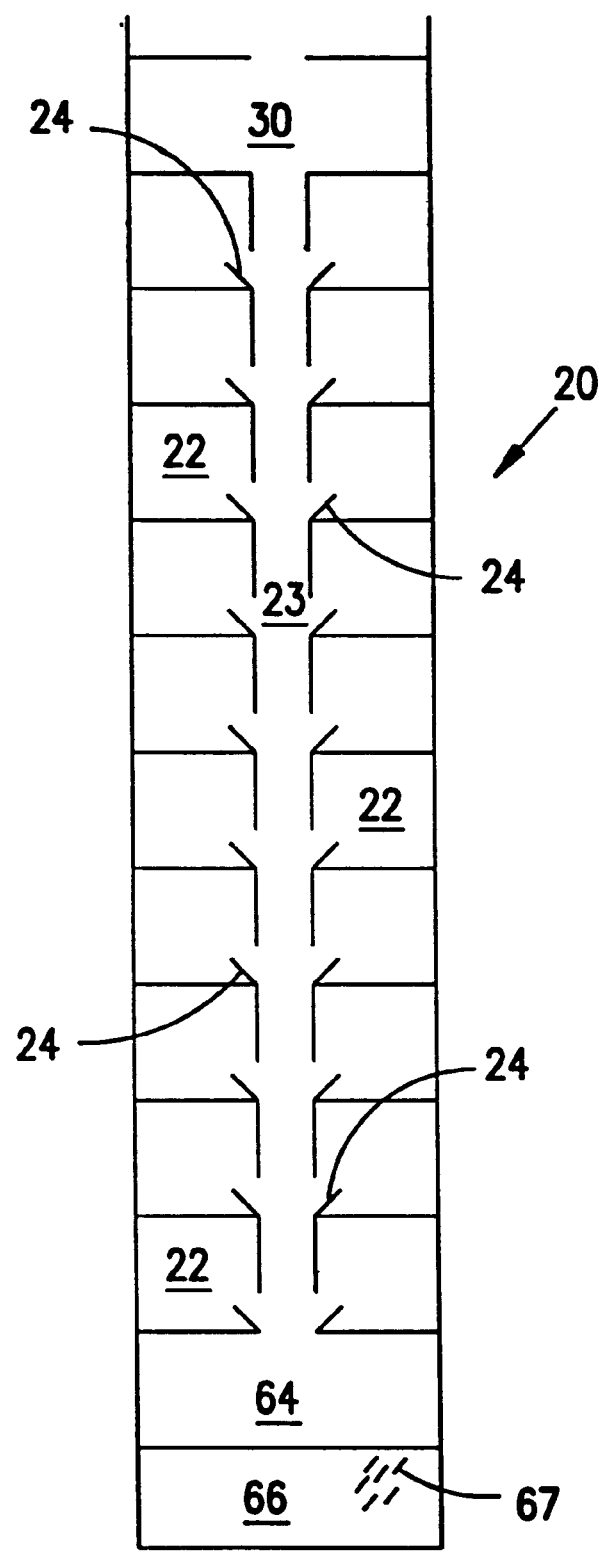
FIG. 2 is a simplified schematic diagram of a building showing a preferred layout for pens and other building features in one embodiment of the present invention.

FIG. 2 shows a schematic of a portion of a layout of the pens 22 and other features of the building 20 in one embodiment of the present invention. Any suitably-sized building 20 can be used to house any suitable number of pens 22 as long as the operator maintains adequate ventilation, facility size and waste management for the pigs contained therein. In a typical operation where forty (40) sows are housed through farrowing and their offspring are housed through market weight, there can be four groups of pens 22 having ten pens 22 each, such that the building 20 is about fifty-four (54) meters long (180 feet) and about six (6) meters wide (20 feet). FIG. 2 shows two of the four groups of ten pens 22 with the remaining two groups of ten pens 22 (not shown) located on the other side of a rectangular or service center 30 located approximately in the center area of the building 20 as indicated. Preferably the two groups of ten pens 22 are arranged in two equally-sized rows as shown with a center aisle 23 of a suitable width between.

The pens 22 can be any suitable size and shape, but are typically square and have gates 24 as shown. The center aisle 23 can be of any suitable width, but is preferably at least about 1.2 meters (four [4] ft) wide. In an alternative embodiment, there is not a third and fourth group of pens 22 on the other side of the service center 30 such that the service center 30 itself is located on one end of the building 22.

The service center 30 can be any suitable size, but preferably extends from one side of the building 20 to the other, and in a preferred embodiment is about 2.4 meters to 3.6 meters (eight [8] ft. to 12 ft.) wide such that adequate space is provided for storage of needed materials such as feed and vitamins, as well as for various activities including washing sows prior to farrowing and loading and unloading pigs. A work space 64 having removable flooring is preferably located towards the end of the building 20 as shown in FIG. 2. The work space 64 is an area below which some of the components of the waste management system 60 (described below) are located. The work space 64 can be any suitable size and shape, but is preferably at least about the same size as the service center 30 such that there is adequate room for maintaining the components below. A bin 66 for holding ground fibrous material 67 is located next to the work space 64. Although the bin 66 can be located in any suitable location, it is preferably a part of the building 20 as shown in FIG. 2, and is covered with the same roof 33 as described above in FIG. 1.

Figure 3:
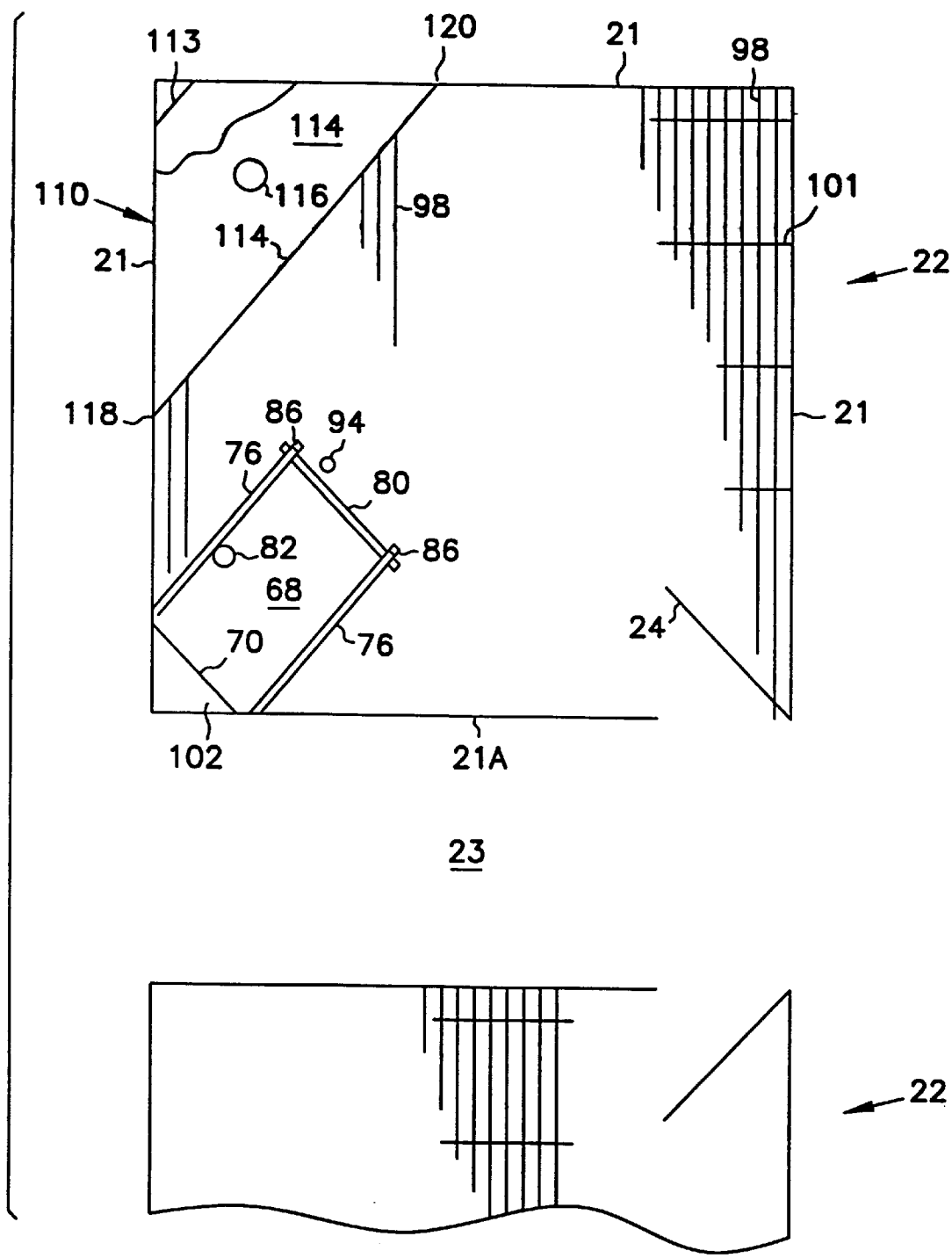
FIG. 3 is a simplified schematic diagram of one embodiment of a preferred pen of the present invention.

FIG. 3 shows a preferred embodiment of the pen 22 of the present invention. Each pen 22 is preferably comprised of four (4) partitions 21, with the partition 21 running parallel and closest to the center aisle 23 having a gate 24 through which the pigs can be taken in and out. The gate 24 can be of any suitable size and shape to allow for transferring of mature pigs. Preferably the gate 24 is about 0.8 meters (30 in.) wide, creating a 0.8 meter (30 in.) space through which the pigs are transferred. As noted above, the partitions 21 of the pens 22 can be of any size and shape but are preferably of equal length. In this way, a square-shaped pen area 22 can be formed when a gate 24 is added to the fourth partition 21 A. Preferably the three partitions 21 are about 2.5 meters to about three (3) meters (eight [8] ft. to ten [10] ft.) in length and the fourth partition 21A is about 1.7 meters to about 2.2 meters (about 5.6 ft. to 7.2 ft.) in length. All of the partitions 21 and 21A are at least about one (1) meter to about 1.1 meter (about 40 in. to 44 in.) high so that the pigs can not jump out. The partitions 21 and 21A can be made from any suitable material, but are preferably non-porous or solid as discussed above, so that air drafts do not blow directly on the pigs. More preferably, the partitions 21 and 21A are made from plastic planks which are readily available in standard widths such as about 20 cm (eight [8] in.). The partitions 21 and 21A and gate 24 can be joined together to form a pen 22 in any suitable manner. The gate 24 is also preferably non-porous and can be made from any suitable material including plastic planks. Also, the partitions 21 running next to and parallel to an inside wall 25 are preferably secured to the interior wall 25 (not shown). In one embodiment, the plastic planks are obtained from Becker Fabricators in Round Lake, Minn. and are fabricated such that they can be dovetailed together and can also slip into suitably-sized channels located in the interior walls 25 (not shown) to create a sturdy pen 22. In another embodiment, the inside walls 25 create one partition 21 of the pen 12 for the middle pens and two partitions 21 of the pen 12 for the end pens.

The flooring inside each pen 22 is preferably made from slats 98. Although the slats 98 are shown running from the front to the back of the pen 22, in practice they are not limited to any particular direction. Preferably the slats 98 are T-shaped and made from aluminum or fiberglass (further described below in FIG. 5).

The preferred pen 22 also has a pig hover 110 or corner creep area created with a pig hover partition 114 and pig hover deckplate 92A. The pig hover partition 114 can be any suitable size, but is preferably approximately an equilateral triangle with each side being less than about 1.2 meters (four [4] ft.).

The pig hover partition 114 can be placed anywhere in the pen, but preferably fits into one corner of the pen 22 to save space. In a preferred embodiment, the pig hover partition 114 is triangular in shape and is located in the corner of the pen 22 nearest to the corner of the farrowing pen 16 so that the gilt or sow can see and communicate with her babies as shown in FIG. 3. The pig hover partition 114 is preferably laid horizontally on top of a suitable frame to create the pig hover area. Although the pig hover partition 114 can be securely attached to the frame, this is not necessary, as the pig hover 110 is removed before the pigs grow large enough to knock the pig hover partition 114 off the frame. Preferably the pig hover 110 is removed at about the same time that the farrowing stall 68 is removed as described below.

Figure 3A:
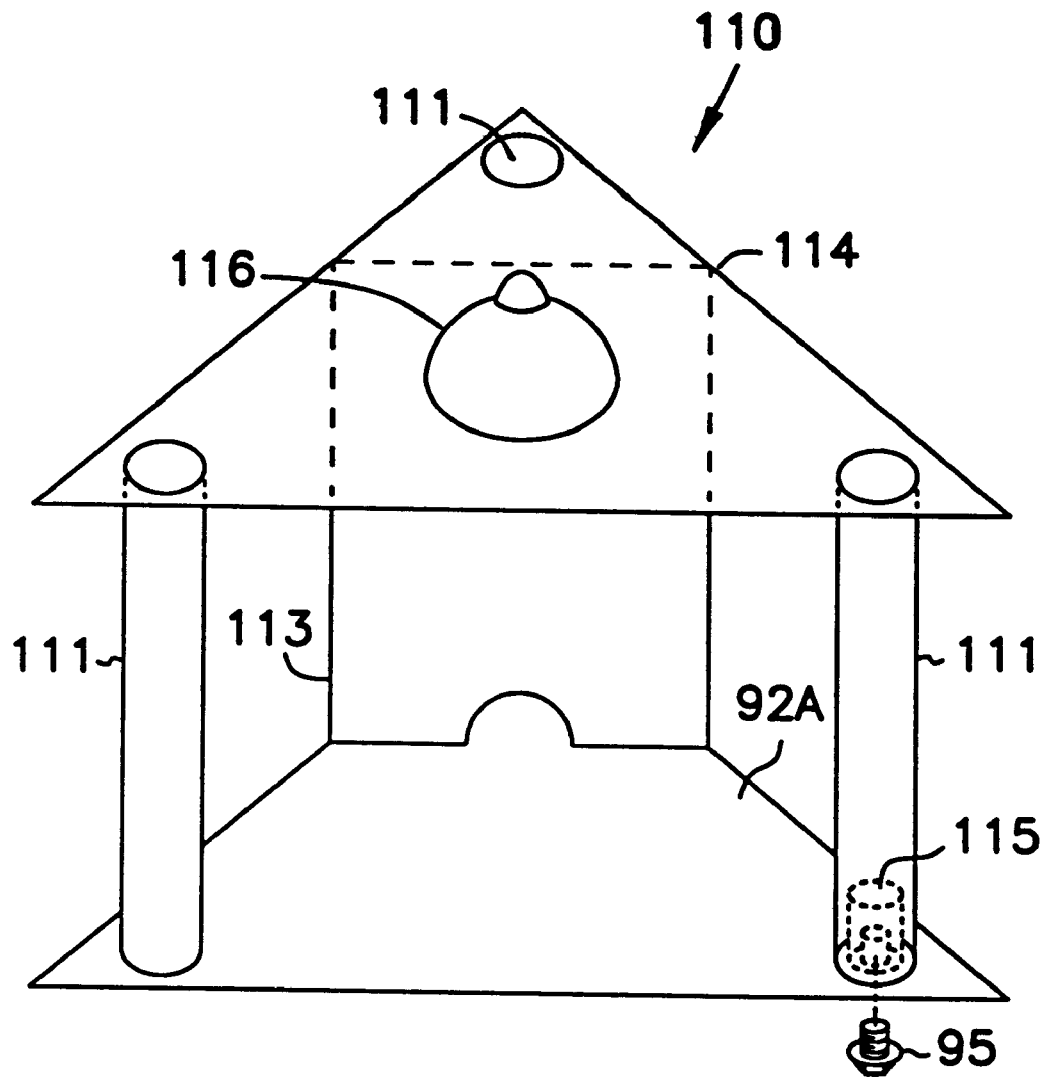
FIG. 3A is a simplified perspective view of a preferred pig hover in one embodiment of the present invention.

The frame is preferably comprised of at least three (3) fiberglass pig hover support pipes 111 of a suitable diameter as shown in FIG. 3A. Although the diameter of the pipes 111 can be relatively small, such as 1.2 cm (0.5 in.), preferably pipes 111 having the same size diameter of other pipes used in the pen 22 are used. In one embodiment, the fiberglass pig hover support pipes 111 having a diameter of at least about 2.54 cm (one [1] in.) are used because this size is readily available and will be used in the preferred farrowing stall 68 discussed below. Each of the three (3) pig hover support pipes 111 are placed over each of three (3) deckplate rods 99 secured to the pig hover deckplate 92A. The three deckplate rods 99 are each at a corner of the triangle as shown in FIG. 3A so that a triangular pig hover 110 can be formed. Each deckplate rod 99 is preferably made from fiberglass, is about 20 cm to about 30 cm (eight [8] to twelve [12] in.) high, and is secured to the pig hover deckplate 92A with a suitable threaded bolt 95 which is preferably plastic or nylon. In a preferred embodiment, the pig hover deckplate 92A and deckplate rods 99 are manufactured as an integral unit, thereby eliminating the need for the threaded bolt 95. By placing each of the pig hover support pipes 111, each having a set of holes on each side near the bottom, over each of the deckplate rods 99, each of which also has one set of holes on opposite sides, the framework for the pig hover 110 is set in place. For added security, however, preferably the holes in the deckplate rods 99 can be aligned with holes in the pig hover support pipes 111 such that a pin 81 can be placed through the holes. Although the pig hover 110 can be adjustable in height by drilling more holes into the pig hover support pipes 111 such that a different set of holes can be aligned with the holes in the deckplate rods 99, this is not required.

Figure 3B:
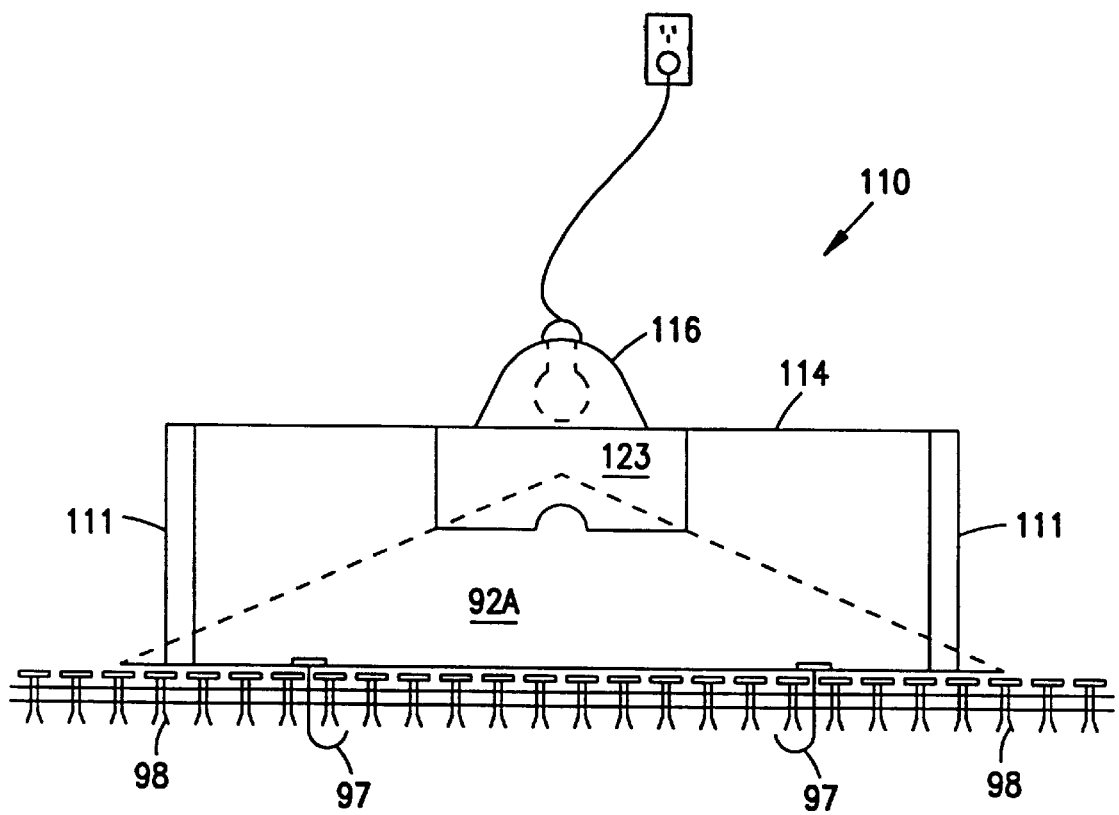
FIG. 3B is a simplified front view of a preferred pig hover in one embodiment of the present invention.

The pig hover deckplate 92A, which is preferably cut to about the same size as the pig hover partition 110, is preferably fastened to the slats 98 with at least three (3) J-bolts or J-pins 97 such that the curved portion of the J-pin 97 hooks onto any suitable portion of the slats 98 such as to the underside of the cross-bar forming the bottom of the T-shaped slats 98 as shown in FIG. 3B. The deckplate 92A is arranged such that the weight of the pigs themselves helps to keep the pig hover deckplate 92A in place. Alternatively the J-pin 97 can be hooked to a tie rod or slat support 101 which holds and spaces the T-bars correctly. In a preferred embodiment, the slat supports 101 are made from fiberglass.

The pig hover partition 114 can be made from any suitable material, including plastic or wood, but is preferably made from fiberglass which is preferably about 0.6 cm (0.25 in.) thick. The use of fiberglass helps to eliminate any problems with rust or corrosion, and reduces contaminant build-up. Furthermore, fiberglass is easily cleaned with water and mild detergent, reducing labor costs and ensuring sanitary conditions are maintained. The pig hover 110 can be heated by any suitable means, including, but not limited to an electric or gas heater. The heating means 116 can be located in any suitable portion of the pig hover 110, but is preferably a light source having a reflector which is placed about in the center of the pig hover partition 114 at about 25 cm to about 30 cm (10 to 12 cm) from the floor so that the young pigs do not inadvertently come in direct contact with it. In a preferred embodiment, a light bulb or heat lamp is used to keep utility costs to a minimum. The light bulb can be any suitable wattage, but is preferably at least 100 watts, and nor more than 150 watts. If the wattage is too high, the pigs can overheat. Preferably, the temperature is controlled automatically by a suitable temperature controller, such as a thermostat so that the temperature in the pig hover 110 remains between about 38° C. and about 43° C. (100° F. to 110° F.). The warmth which is generated within the pig hover 110 lures the young pigs away from their mother, keeping them safe from possible crushing or smothering between nursings.

With the use of a pig hover feeding partition 113, the pig hover 110 can also be used as a feeding area for the young pigs. Preferably the pig hover feeding partition 113 has one or more holes through which feed can spill and is slid into place using channels or slots in two adjacent partitions 21 of the pen 22. The hole or opening can be any suitable size but is preferably the approximate size of a mouse hole located at the bottom of the feeding partition 113 as shown in FIG. 313. In this way, only a small amount of feed comes through the hole at any one time, which the young pigs can lick. With this feeding system in place, the feed is essentially maintained as new or fresh feed for the pigs, which is preferable to having old or stale feed which pigs typically reject. In an alternative embodiment, the pig hover partition 114 can be designed to fit into horizontal channels in adjacent walls of the pen and supported with one or more suitable supports or rods to create the pig hover 110.

Referring again to FIG. 3, a farrowing stall 68 of a suitable size and shape is preferably located within each pen 22. In one embodiment, the farrowing stall 68 is about 1.8 meters by about 0.6 meters (six [6] by two [2] ft.). The farrowing stall 68 can be located anywhere within the pen 22 as long as a sow contained therein can reach a feeder or feeding area 102. Preferably the farrowing stall 68 is placed at an angle to the front corner of the pen 22 furthest from the gate 24 as shown in FIG. 1, such that the sow is facing this front corner. This location is preferred because it allows the operator or caretaker to employ a feed panel 70 described below and also allows easy access to the gilt or sow by the caretaker, if needed, during farrowing.

Any conventional design and material for a farrowing stall 68 can be used. In a preferred embodiment, each farrowing stall 68 is comprised of one or more side panels 76, front and rear vertical support pipes 84 and 86, respectively, and a "back-up" or end bar 80 as shown in FIG. 3. The farrowing stall 68 can be made from any suitable material which is adequate to hold a gilt or sow weighing from about 135 kg to about 365 kg (300 to 800 lbs.), such as metal. In a preferred embodiment, the farrowing stall 68 is made from a combination of solid fiberglass rods and thick-walled fiberglass pipe. The use of fiberglass for the farrowing stall 68 has all of the advantages noted above with the pig hover partition 110. Furthermore, fiberglass pipes and rods are extremely strong, yet lightweight.

Each side panel 76 and the end bar 80 is arranged so that a gilt or sow has ample room to breathe comfortably, but so that her movement side to side and front to back is somewhat restricted. Although the sow's movement is somewhat restricted as described, a sow typically will not leave a farrowing stall 68 after she farrows unless she is forced to, as the sow instinctively wants to stay with her offspring. In a preferred embodiment, each of the side panels 76 are removable and adjustable in height so they can be fitted appropriately for each gilt or sow during farrowing, and removed at a suitable time after farrowing is finished.

The gilt or sow is placed in the farrowing stall 68 when the caretakers first notice that farrowing is near. It is clear that farrowing is near when the gilt or sow's nipples fill with milk, and the sides of the animal begin to sink. The farrowing stall 68 is preferably supplied with a suitable heat source 82 nearby immediately prior to and during farrowing. In a preferred embodiment, at least three (3) infrared heat lamps are hung or clamped onto each of the side panels 76 and also onto the end bar 80 so that when the pig is born it is immediately "penetrated" with infrared heat to help it keep warm until its internal thermostat begins controlling body temperature. Heat lamps provide an economic and efficient source of heat for the limited time it is required. In alternative embodiments, other heat sources 82 can be used, including, but not limited to space heaters, heating pads, or gas heaters.

Figure 4:
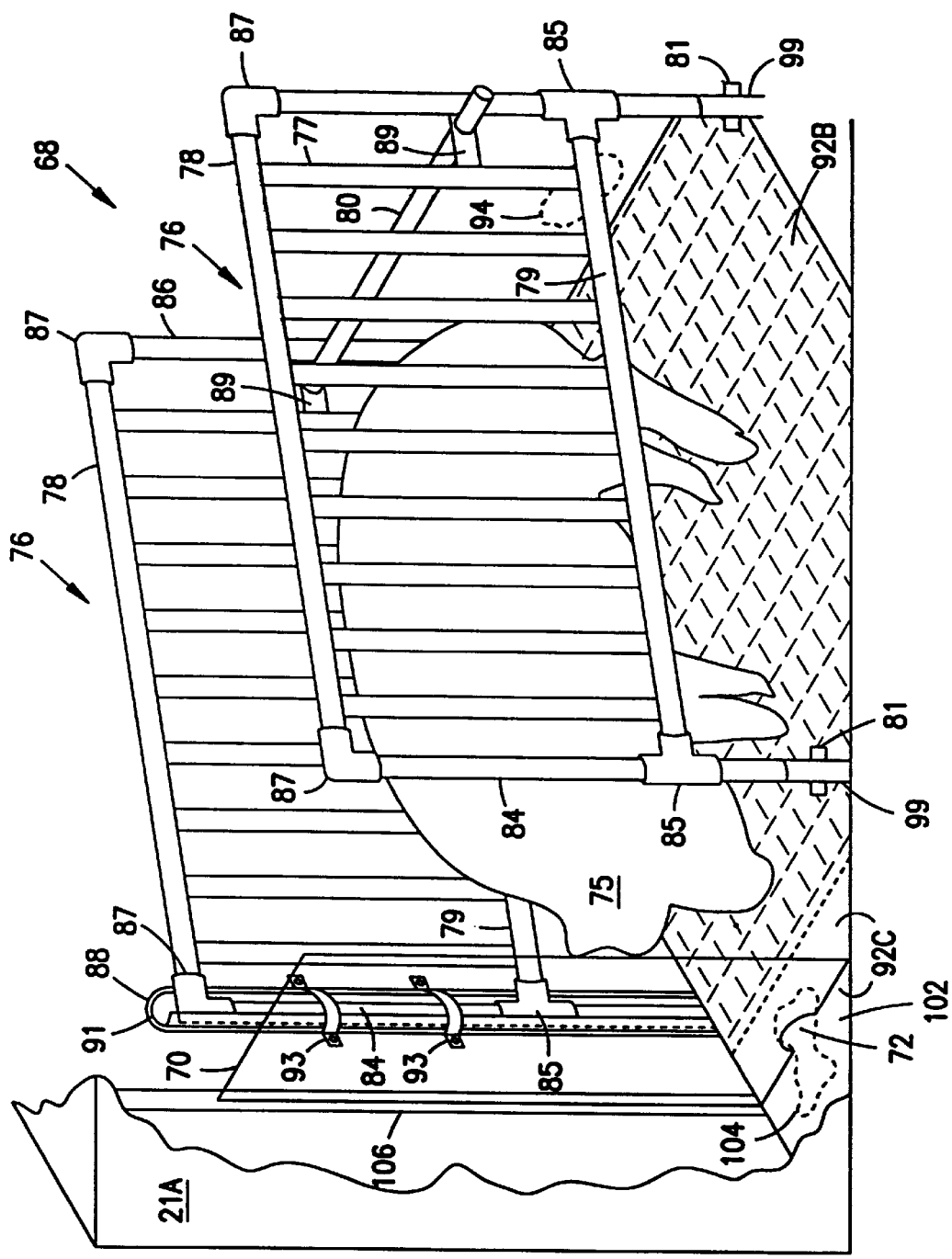
FIG. 4 is a cut-away perspective view of one embodiment of an adjustable farrowing stall and feeder panel of the present invention.

As shown in FIG. 4, each side panel 76 is preferably comprised of a suitable number of vertical rods 77 located between a top and bottom horizontal rail, 78 and 79, respectively, and arranged so that a large pig 75 can be confined. In one embodiment about twenty-four vertical rods 77 are used which are spaced at a suitable distance such that neither the young pigs nor the sow can get their heads caught in between the vertical rods 77. In one embodiment, the vertical rods 77 are spaced about 15.2 cm (six [6] in.) apart. As discussed above, the side panels 76 can be made from any suitable material, but are preferably made from fiberglass. Specifically, the top and bottom horizontal rails 78 and 79 are preferably thick-walled fiberglass pipe, and the vertical rods 77 are preferably solid fiberglass rods. Any type of connecting system can be utilized to connect each of the vertical rods 77 to the top and bottom horizontal rails 78 and 79. Preferably there are adequately-sized holes drilled or pre-drilled into the top and bottom horizontal rails 78 and 79 such that each end of the vertical rods 77 can be slipped into these holes and stay securely in place.

Any suitable type of connecting system can be utilized to connect each side panel 76 to the front and back vertical support pipes 84 and 86, respectively, as long as the components remain secure and in place when a sow 75 is inside the farrowing stall 16. In the embodiment shown in FIG. 4, the bottom horizontal rail 78 is joined to the front and back vertical support pipes 84 and 86 with a suitable T-joint 85, and the top horizontal rails are joined to the front and back vertical support pipes 84 and 86 with a suitable L-joint (90° elbow) 87. The T-joints 85 and elbows 87 can be made from any suitable material which is sufficiently strong to hold the side panels 76 securely to the front and back vertical support pipes 84 and 86. In one embodiment, the T-joints 85 and elbows 87 are made from copper or polyvinyl (PVC) pipe. In an alternative embodiment, the horizontal rails 78 and 79 are smaller in diameter than the front and back vertical support pipes 84 and 86 such that each of the horizontal rails 78 and 79 fit into holes located at various heights along the front and back vertical support pipes 84 and 86, respectively. In another alternative embodiment, the farrowing stall 68 has side panels 76 which are a series of horizontal rails of a sufficient height and number to confine a large pig. In yet another alternative embodiment, the side panels 76 are made from a solid piece of material, or a suitably strong wire mesh material.

Figure 4A:
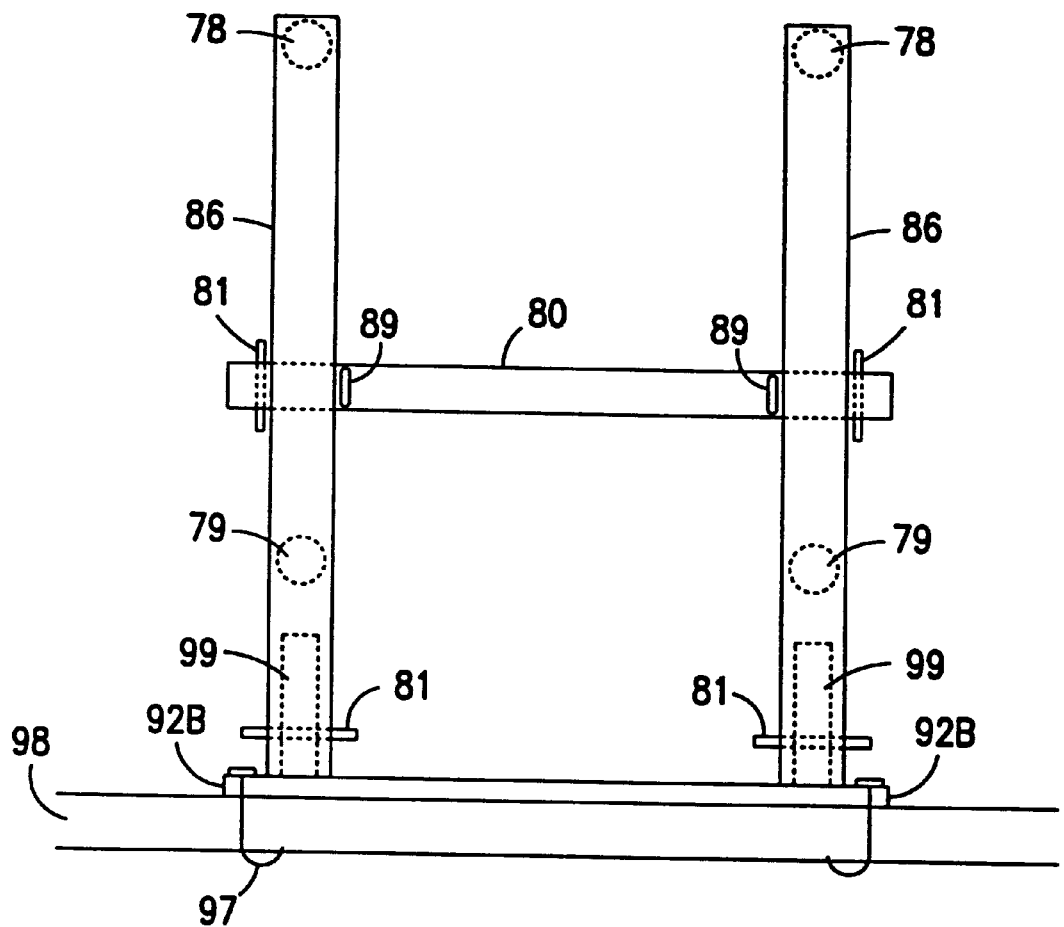
FIG. 4A is a simplified rear view of an end bar and vertical support pipes of a farrowing stall in one embodiment of the present invention.

The end bar 80 can be connected to the back vertical support pipes 86 in any suitable manner. In a preferred embodiment, each end of the end bar 80 fits through a hole located in each of two plastic or fiberglass members 89. The members 89 are of a suitable length and width, preferably about 15 cm (six [6] in.) long and about ten (10) cm (four [4] in.) wide and about 0.6 cm (0.25 in.) thick such that they fit across the space between two of the vertical rods 77. More preferably, each member 89 fits between a back vertical support rod 86 and the respective adjacent vertical rod 77 of each side panel 76. In the embodiment shown in FIGS. 4 and 4A, the hole in each member 89 is placed such that the end bar 80 is across the inner edge of the back vertical support pipes 86 so that the large gilt or sow 75 cannot push the end bar 80 off. The end bar 80 can be first placed through the holes of the two members 89 and the members 89 then secured in place or the end bar 80 can be slid through the holes after the members 89 are in place. The members 89 are tightened in place by any suitable method, including, but not limited to, a bracket, or U-bolt such as is used for the front vertical support rods, or the members 89 can be bolted in place. The end bar 80 preferably has a pin 81 on each end which can slip through holes in the end bar 80 which are located in that portion of the end bar 80 sticking out through the hole in the member 89, such that the end bar 80 is held in place. In an alternative embodiment, a pin 81 having a head with a diameter wider than holes in each of the members 89 can be used. In such an alternative embodiment, each pin 81 can either have a head on one end and a hole on the other end such that it can be pushed or threaded into place on each end of the end bars 80, or one or both pins 81 can have a head on one end and a shaft on the other end which fits into a hole in each end of the end bar 80 when pushed. In a preferred embodiment, the pin 81 on one end of the end bar 80 is permanently attached. With use of both members 89, the end bar 80 is infinitely adjustable for height between the top and bottom horizontal rails 78 and 79, respectively. In another alternative embodiment, the end bar 80 can be placed in one set of holes preferably located at equal heights in each of the back vertical support pipes 86. In this embodiment, there are preferably more than one set of holes located at various heights along the back vertical support pipes 86 so that the end bar 80 can be adjusted for various-sized pigs.

In a preferred embodiment as shown in FIG. 4, the front vertical support pipes 84 "snap" into pipe holders 91 located in vertical channels 88 in the side and front walls of the pen 22. The pipe holders 91 can be any suitable holders, but are preferably PVC pipes which have each had a wide slit cut such that each can receive and hold a front vertical support rod 84 in place. After each of the front vertical support pipes 84 are pushed into place in each of the pipe holders 91 they are preferably further secured with one or more brackets 93. The brackets 93 can be any suitable bracket, including, but not limited to common screen door fasteners, clasps or even snaps such as are found on harnesses. Although the vertical channel 88 and pipe holder 91 (only one of two vertical channels 88 and two pipe holders 91 are shown in FIG. 4) are shown extending all of the way to the bottom of the partition 112, in an alternative embodiment, neither the vertical channels 88 nor the pipe holders 91 extend to the top or the bottom of the partition 112, and the vertical support pipes 84 are secured directly to each partition 112 with one or more brackets 93 near the bottom and/or top of the partition 112.

Figure 4B:
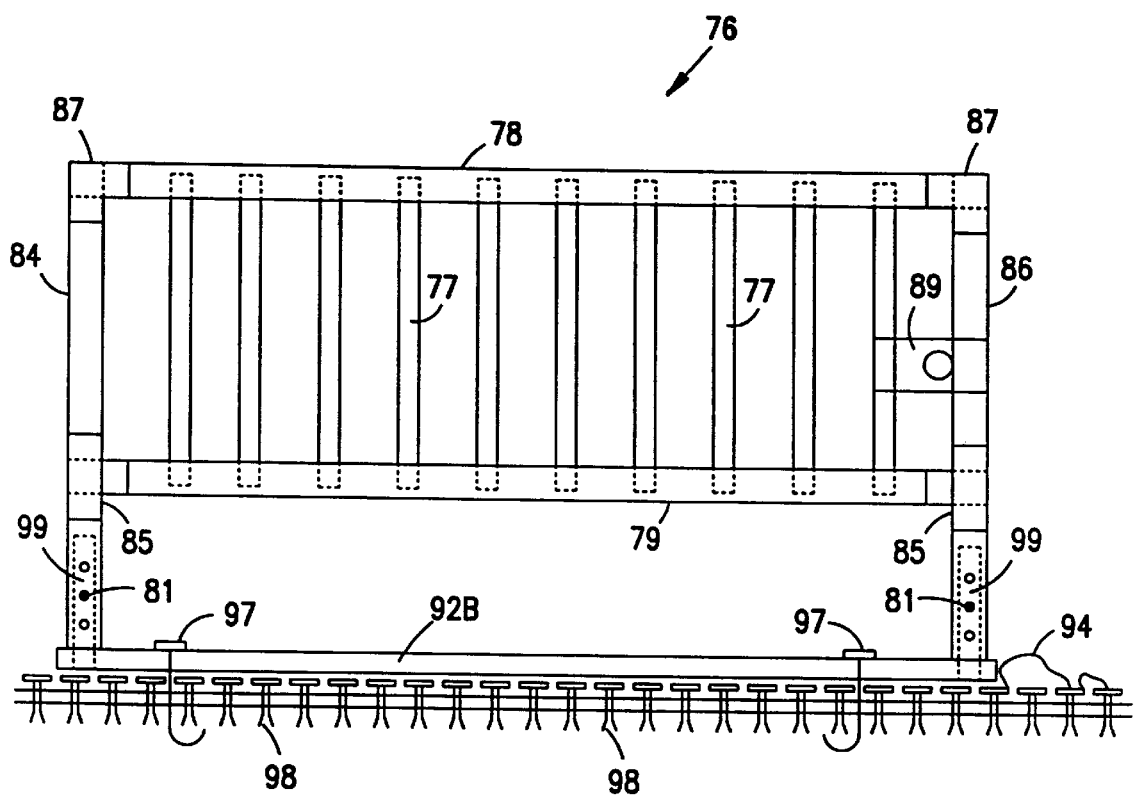
FIG. 4B is a simplified schematic diagram of a side view of a farrowing stall in place on deckplate in one embodiment of the present invention.

The lower ends of both the front and back vertical support pipes 84 are securely fastened to a farrowing stall deckplate 92B which rests on top of the slats 98 as shown in FIG. 4B. The farrowing stall deckplate 92B can be made from any suitable material such as steel, plastic, or aluminum, but is preferably fiberglass. Preferably the farrowing stall deckplate 92B can be made from the same material from which the members 89 are made. The farrowing stall deckplate 92B can be any suitable thickness, but is preferably about 0.6 cm (0.25 in.) thick and is cut to a size of about 1.8 meters by about 0.9 meters (six [6] by three [3] ft.) such that it extends out about 15 cm (six [6] in.) on each side to provide a safe and comfortable flooring for the nursing babies. The farrowing stall deckplate 92B can be secured to the slats 27 in any suitable manner, but is preferably secured with a J-pin 97 as shown in FIG. 4B in the same manner as described for the pig hover deckplate 92A.

Figure 4C:
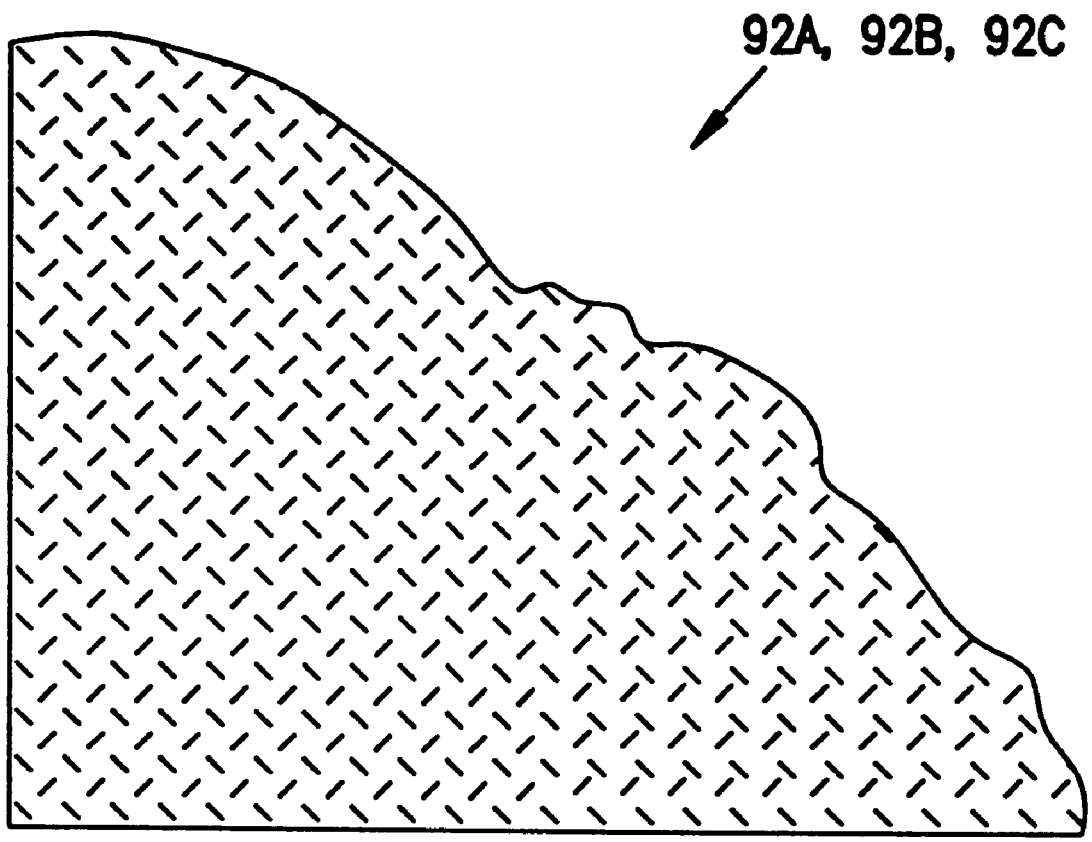
FIG. 4C is a schematic diagram of one embodiment of preferred deckplate material having texture in one embodiment of the present invention.

In one embodiment, the deckplate for the pig hover 110, farrowing stall 68, and the feeding area 102 (described below), 92A, 92B and 92C, respectively, is fiberglass and has a textured surface as shown in FIG. 4C. Any suitable shape to the raised portion and any suitable pattern for the raised portion of the deckplate can be used such that the pigs are provided with secure footing.

The front and back vertical support pipes 84 and 86 can be fastened to the farrowing stall deckplate 92B in any suitable manner. Referring again to FIGS. 4A and 413, each front and back vertical support pipes 84 and 86 are placed into a suitable deckplate rod 99 which has holes on each side located at one or preferably two or more heights along the deckplate rod 99. As discussed above with the pig hover 110, the deckplate rod 99 is preferably made from fiberglass, is about 20 cm to about 30 cm (eight [8] to twelve [12] in.) high. The deckplate rod 99 can be secured to the farrowing stall deckplate 92B with a suitable threaded bolt 95 which is preferably plastic or nylon. In a preferred embodiment, the farrowing stall deckplate 92B and deckplate rods 99 are manufactured together, thereby eliminating the need for the threaded bolt 95. By placing each of the front and back vertical support pipes 84 and 86, each having holes on each side near the bottom, over the deckplate rods 99, the farrowing stall 68 is set in place. By aligning the holes of the front and back vertical support pipes 84 and 86, respectively, with a different set of holes in the deckplate rods 99, the height of the farrowing stall 68 can be adjusted. The farrowing stall 68 is secured in place with suitable pins 81 such as are used to secure the end bar 80 as described above. In this way, the side panels 76 can be adjusted for height, depending on the height of each sow's udder from the floor when she lays down to nurse her babies. Furthermore, the newborn pigs are protected from their mother during their first few days of life when they are so vulnerable to being crushed or smothered. In the alternative embodiment wherein two or more horizontal rails are used for the side panels 76, one or more of the horizontal rails, preferably the bottom rails are adjustable for height.

The top and bottom horizontal rails 78 can be any suitable length and diameter, but are preferably about 1.5 meters to about two (2) meters (five (5) to seven [7] ft.) long and about 2.9 cm to about five (5) cm (1⅛ to two [2] in.) in diameter. The vertical rods 77 can be any suitable length and diameter and preferably are about one (1) meter to about 1.2 meters (three [3] to four [4] ft.) long and about 1.3 cm to about 2 cm (½ to ¾ in.) in diameter. The end bar 80 can also be any suitable length, and is preferably at least 0.5 meters to about one (1) meter (20 to 40 in.) long, and more preferably at least 0.75 meters to about 0.9 meters (30 to 36 in.) long to fully accommodate the width of a pig, plus about ten (10) cm. (four [4] in.) of extra space on either side of the pig. The end bar 80 can be any suitable diameter and is preferably about 2.9 cm to about five (5) cm (1⅛ to two [2] in.) in diameter. In a preferred embodiment, the top and bottom horizontal rails, the end bar, and the front and back vertical support rails are thick walled fiberglass pipe about 2.9 cm (1⅛ in.) in diameter.

The end bar 80 can be placed at any suitable height, but is preferably placed about 0.5 meters to about 0.8 meters (20 to 30 in.) above the level of the farrowing stall deckplate 92B. If the end bar 80 is placed too low, the manure 94 will pile up on top of the slats 98 inside the farrowing stall 68. In a preferred embodiment, the end bar 80 is placed about 0.6 meters (two [2] feet) above the level of the farrowing stall deckplate 92B. In this way, when the gilt or sow backs up to relieve herself, which is the typical behavior for this animal, the end bar 80 stops her backwards movement. This forces the sow or gilt to release the excrement or manure 94 outside of the farrowing stall 68 itself. Thereafter, as she lays down towards the back of the farrowing stall 18, which is also typical behavior, her body will eventually force the manure 94 through the slats 98. The farrowing stall deckplate 92B preferably does not extend out beyond the end bar 80 because otherwise the manure 94 generated by the sow 75 can land on the farrowing stall deckplate 92B and not onto the slats 98 as is preferable. In another alternative embodiment, the side panels 76 and the end bar 80 are actually solid panels made from any suitable material, which does not extend all of the way to the slats or flooring. Alternatively, the end bar can be a solid sheet of material which extends vertically to the farrowing stall deckplate 9213, but has an opening through which the sow can eliminate.

The side panels 76, end bar 80 and farrowing stall deckplate 92B are removed when the young pigs are active and alert enough to move away from their mother when she moves or lays down. This can occur when the pigs are between about four (4) and ten (10) days old, but typically occurs when they are about one week of age. At about the same time as the farrowing stall is removed, the pig hover partition 114, pig hover deckplate 92A and pig hover support pipes 111 are also preferably removed as the young pigs do not need to be lured away from the sow 75 any more and are also more able to regulate their own body temperature to keep warm. Even though the farrowing stall 68 is no longer in the pen 22, the sow will typically continue to lay in approximately the same spot to nurse her pigs, as she appears to be comfortable in that location, and can remain close to her pigs.

Any known method for feeding pigs in a small or large-scale hog operation can be used. Referring again to FIG. 4, preferably one or more feed panels 70 are used to create a suitably sized self-feeding area 102. In one embodiment, the self-feeding area 102 is a triangular shape with each side about 60 cm to about 85 cm (24 to 30 in.) in length. In a preferred embodiment shown in FIG. 4, a feed panel 70 is shown in place in the corner of the pen 22 near the farrowing stall 68 so that a self-feed area 102 is easily created. A feed panel 70 can also be placed in other corners of the pen 22 as well. The feed panel 70 can be made from any suitable material, but is preferably made from aluminum or fiberglass because it does not rust as galvanized steel can and is much cheaper than stainless steel. Furthermore, since the partitions 21 which are essentially the back walls of the self-feeding area 102 are preferably plastic, feed does not cling tightly to the walls, as compared with conventional surfaces, making clean-up easier. The feed panel 70 can rest on a feed area deckplate 92C.

The feed area deckplate 92C is preferably separated from the farrowing stall deckplate 92B because the farrowing stall deckplate 92B is removed after a period of time when the farrowing stall 68 is removed. In one embodiment the feed area deckplate 92C extends out beyond the feed panel 70 a suitable distance so that when the farrowing stall deckplate 92B is removed, most or all of the feed 104 comes through one or more openings 72 in the feed panel 70 onto the feed area deckplate 92C rather than directly onto the slats 98. The opening can be any suitable size but is preferably the approximate size of a mouse hole located at the bottom of the feed panel 70 as shown in FIG. 4. In this way, only a small amount of feed comes through the hole at any one time, which the sow can lick. With this feeding system, the feed is essentially maintained as new or fresh feed for the sow 75, which is preferable to having old or stale feed which the sow 75 typically rejects. The feed panel 70 can be secured in place in any suitable manner. In the preferred embodiment shown in FIG. 4, the feed panel 70 is placed in vertical channels 106 in adjacent walls 21 of the pen 22, to accommodate a suitably sized feed panel 70. In one embodiment, the feed panel 70 is about 46 cm (18 in.) to about 60 cm (24 in.) in length creating a triangular-shaped feed area 102 with each side about 46 cm (18 in.) to about 60 cm (24 in.) in length.

As noted above, when the pigs are about one week, the side panels 76 can be removed and cleaned or set aside for later use. In this way, the sow can move around in the pen 22, yet eat from her own feeding area 102. The young pigs can now also eat in the feed area 102 as well as in the pig hover 110. The preferred arrangement of these features as described above and shown in FIGS. 3 and 4 saves valuable space within the pen 22 itself.

Figure 5:
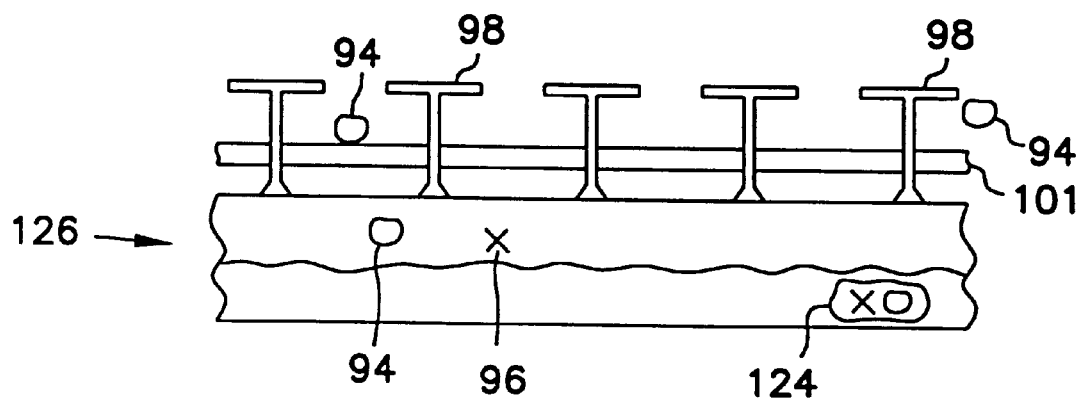
FIG. 5 is a simplified schematic diagram of a preferred slat of the present invention.

As shown in FIG. 5, a T-bar shaped slat 98 made from fiberglass or aluminum is preferable because it allows manure 94 to be sheared off and drop into a first gutter system 126 with minimal adherence as compared to concrete or metal T-shaped slats. As the pigs walk around or lay down on the slats 98 or even on the deckplates 92A and 92B, more and more of the manure 94 is forced down between the slats 98. The edges of the preferred T-shaped fiberglass or aluminum slat 98, shear off the manure 94, allowing it to fall directly into the first gutter system 66 below. The slats 98 preferably come in units about 1.2 meters (four [4] ft.) wide and about six (6) meters (20 ft.) long. They are preferably supported with the slat members 101 which are preferably turned on edge to decrease the amount of manure 94 clinging to the slat members 101. In one embodiment, the slat members 101 are more than about 1.2 meters (four [4] ft.) in length such that the slats 98 come in sections which are 1.2 meters (four [4] ft.) in width. The slat members 101 preferably extend about 0.5 cm (0.2 in.) on each side so that when in place, there is a gap between the slats 98 of about one (1) cm (0.4 in.) The slats 98 can also be of any suitable size and spaced any suitable distance apart, but are preferably about 2.5 cm (one [1] in.) in width and spaced about 0.95 cm (0.375 in.) apart. It is well-known that this spacing is preferred because it is large enough for manure 94 to be worked through and give a foothold for the larger or mature pig, yet is also small enough so that a small pig's feet cannot slip through and become caught.

Although the slats 98 can be made from any suitable material, such as steel, iron, concrete, aluminum or plastic, they are preferably made from fiberglass. Although aluminum can be used because it typically does not corrode as fast as an iron slat would rust, it tends to be colder than fiberglass and is also very slippery which can cause the pigs to lose their footing. Furthermore, fiberglass can easily be manufactured more accurately than other materials, such as concrete, to provide the desired spacing. Unlike heavy wire mesh, which only support the weight of one sow and her newborns, fiberglass is extremely strong, and can hold up to about 800 lbs/in$^2$ or more, which is about equal to the weight often (10) or more pigs, each weighing about 240 lbs. or more. Fiberglass, unlike wet concrete, steel, or aluminum, does not conduct electricity. Furthermore, as discussed above, fiberglass cannot rust or corrode, and does not promote the growth of contaminants, including viruses and bacteria. Fiberglass has been found to be preferred by pigs likely because it is warmer than conventional slats made from concrete, steel or aluminum. Specifically, pigs have been observed laying separately when using fiberglass slats, rather than crowding together for warmth as they typically do on steel, concrete or aluminum slats or on solid concrete floors. In one embodiment, the fiberglass slats are made by AFC, Division of Morrisson Molded Fiber-Glass Co., South Chatfield, Minn. In an alternative embodiment, the slats 98 are made with molds, in order to reduce the cost of manufacture. In another alternative embodiment, a manufacturer such as Reynolds Aluminum in Dallas, Tex. can use molds to extrude aluminum slats for use in the present invention.

When the pigs are weaned, usually at about 12 to 28 days of age, the sow is taken away, typically to another building for rebreeding. The young pigs, having received important nutrients and antibodies from their mother's milk, and having adjusted to the bacteria in their own environment now continue to grow efficiently in the pen 22.

In order to keep conditions sanitary, an advanced waste control system is used which collects the pig waste in a gutter system located beneath the slats, combines it with a fibrous material which is released from a nearby bin, slowly composts the pig waste and fibrous material or mash within the building through the use of central blending conveyors to produce end products useful in agriculture and gardens.

With the above-described method and apparatus, gilts or sows are able to farrow and wean their pigs in one location. Further, the weaned pigs remain in the pen throughout their nursery period, growing and finishing periods, and until such time as they achieve full market weight. This one-step farrow to finish system eliminates the typical three or four hazardous and lengthy moving operations which occur during a pig's farrow to finishing period, resulting in a healthier and more profitable hog.

The invention will be further described by reference to the following prophetic example which is offered to further illustrate various embodiments of the present invention. It should be understood, however, that many variations and modifications may be made while remaining within the scope of the present invention.

PROPHETIC EXAMPLE

Figure 6:
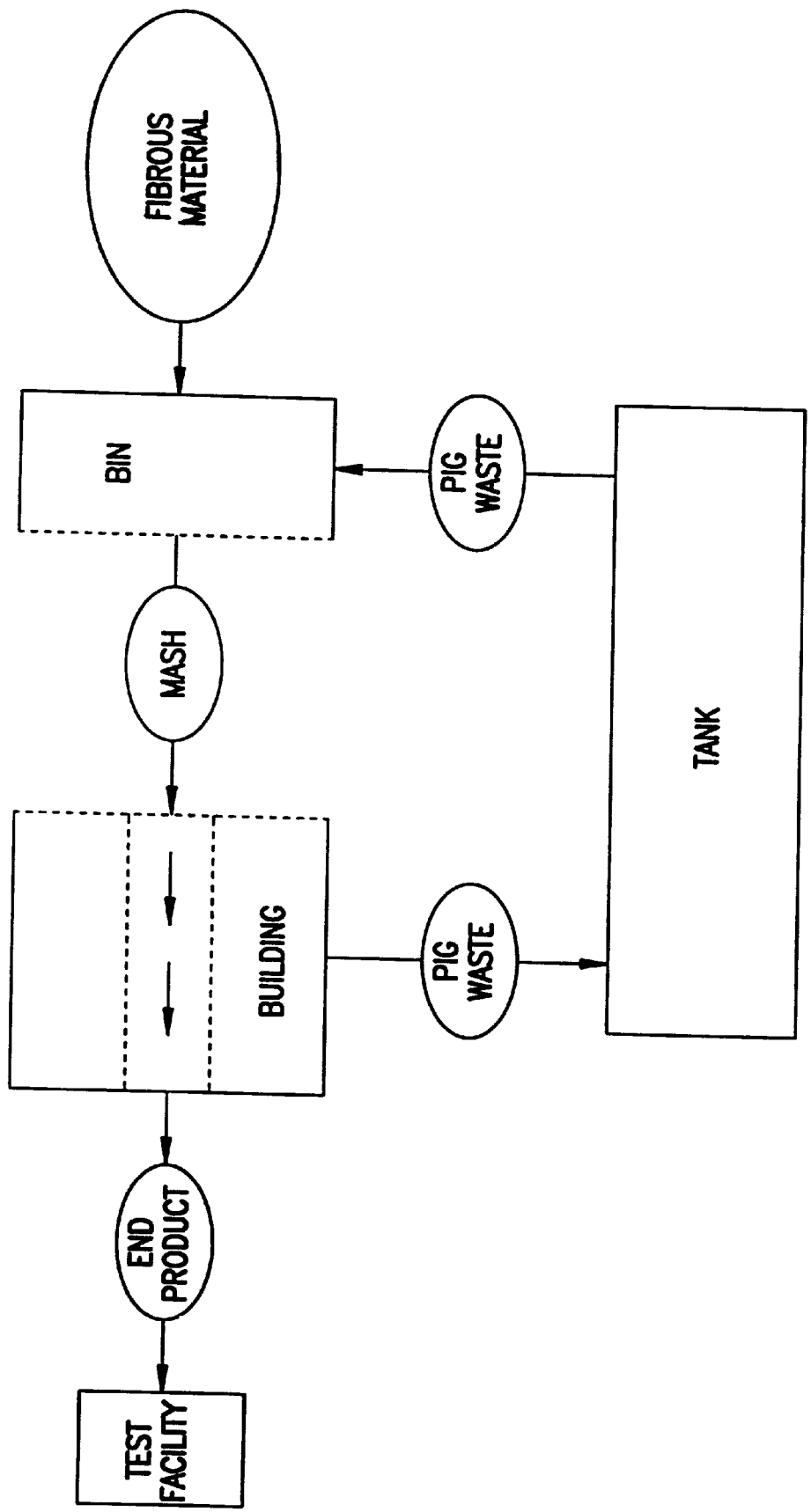
FIG. 6 is a simplified flow diagram of the waste control system of the present invention, showing the flow of the combined pig waste and fibrous material or mash.

In order to keep conditions sanitary, while reducing odors and associated environmental problems, the waste control system of the present invention is designed to compost the pig waste continuously. FIG. 6 is a simplified flow diagram of a preferred embodiment of the present invention in which pig waste and fibrous material are composted to produce a useful end product. As shown in FIG. 6, at start-up, pig waste which has collected in a gutter system located in a building is released into a tank. After a period of time, the pig waste is pumped out of the tank and sprayed into a bin area which has been loaded with fibrous material prior to start-up. The pig waste and fibrous material are mixed together in the bin area by a bin blending conveyor. The fibrous material and pig waste leave the bin area as a mash and enter the main portion of the building. The mash is slowly moved and mixed by a central blending conveyor so that it can compost. The compost or end product is transported out of the building by an end product blending conveyor to another building or test facility for testing so that the appropriate use of the end product can be determined.

Figure 7:
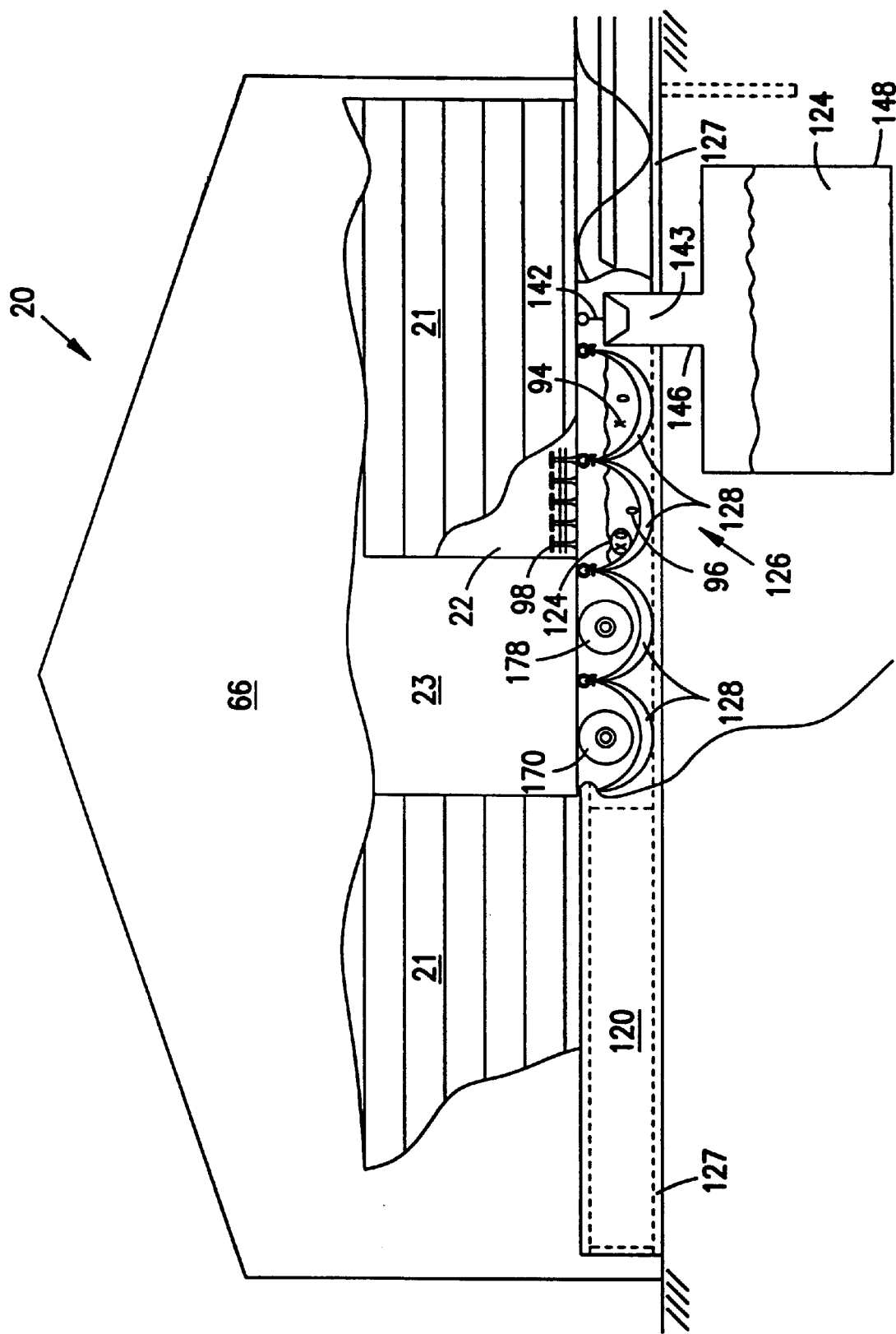
FIG. 7 is a simplified cut-away end view of the end of the building opposite the end shown in FIG. 1 in one embodiment of the present invention.

As shown in FIG. 7, the bin 66 is located at the end of the building opposite end shown in FIG. 1. Also as shown in FIG. 7, the pig waste 124 comprising solid manure 94 and urine 96 is eliminated as usual by the pigs in their pen 22 having T-shaped fiberglass slats 98 as the flooring. The urine 96 falls into a first gutter system 126 and the manure 94 also drops from the slats 98 after a period of time into the first gutter system 126. All of the gutters in the present invention, including the gutters of the first gutter system 126 preferably rest on a layer of sand 127 about ten (10) cm (four [4] in.) deep. Any suitable size, shape and number of pipes can be used in the first gutter system 126. The exact size of the first gutter system 126 for a given operation will be determined by the needs of the particular operation and the space available.

Figure 7A:
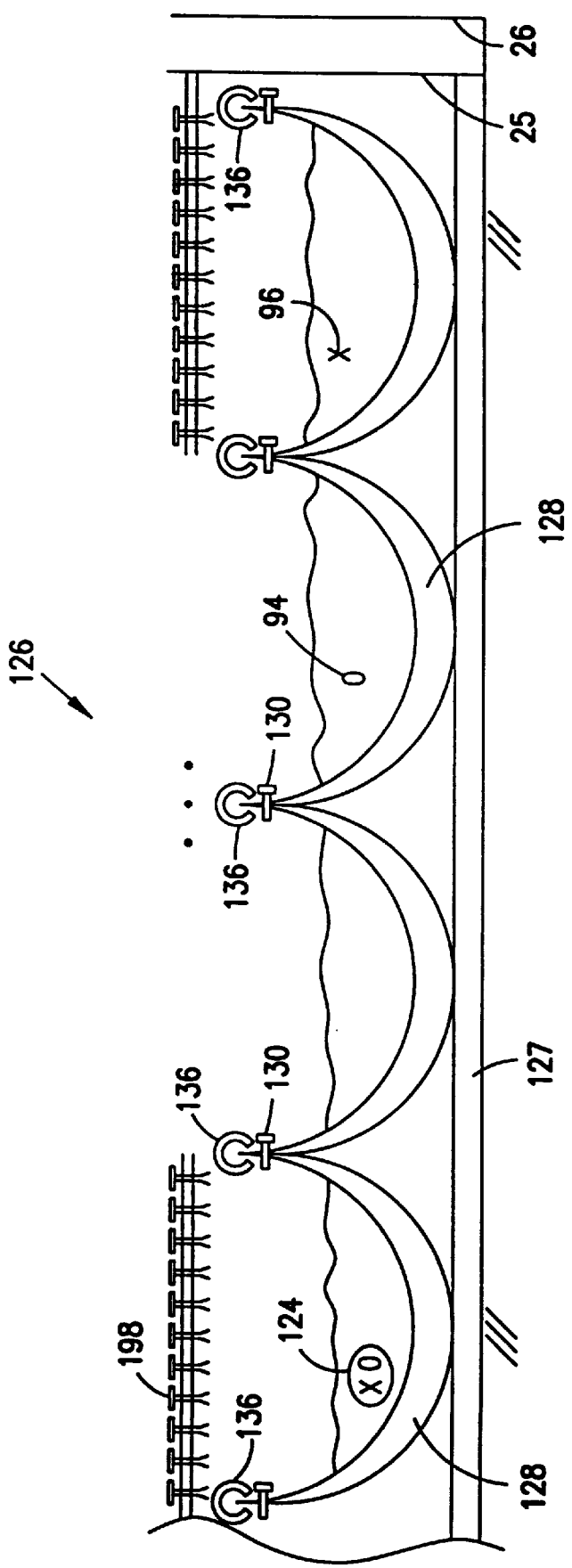
FIG. 7A is a simplified end view of a first gutter system in one embodiment of the present invention.

Referring to FIG. 7A a preferred embodiment of a first gutter system 126 is shown which comprises a series of gutter pipes 128 connected together. The first gutter system 126 can also be comprised of only one large gutter pipe 128 or any other desired number of gutter pipes 128. In the embodiment shown in FIG. 7A four gutter pipes 128 in a first gutter system 126 are connected together. The gutter pipes 128 can be of any suitable size and shape which are adequate to hold the pig waste 124 in a given operation. Preferably, each of the gutter pipes 128 are the shape of half-circles about 30 cm. to 91 cm. (twelve [12] to thirty-six [36] in.) in diameter, which are made by cutting a circular pipe in half with a suitable cutting tool. In a preferred embodiment, the gutter pipes are about 61 cm (24 in.) in diameter.

When more than one gutter pipe 128 is used, they are preferably together at the top edges such that they fit snugly together. Although the gutter pipes 128 can be attached in any suitable manner, preferably they are each fastened together at the top edges with bolts 130 and a slotted pipe 136 to prevent shifting and leaking. In the embodiment shown in FIG. 7A, each slotted pipe 136 fits over the joints between each of the gutter pipes 128. Each slotted pipe 136 is preferably a suitably-sized plastic pipe, such as a PVC pipe. In a preferred embodiment, each slotted pipe 136 is about 2.5 to five (5) cm (one [1] to two [2] cm) in diameter, and has a slot about 1.3 cm to about 2.5 cm (0.5 in to about one [1] in.) wide allowing it to fit tightly over the respective joints between each of the gutter pipes 128.

Any ready-made gutter pipes 128 can be used which are suitable for cutting and handling pig waste. The gutter pipes 128 are preferably of a suitable length, up to about six (6) meters (20 ft). In a more preferred embodiment, the gutter pipes 128 are as long as 12 meters (40 ft.) or more. The exterior walls of the gutter pipes 128 are preferably corrugated to provide strength to the non-corrugated smooth interior walls even when cut in half horizontally. Furthermore, the gutter pipes 128 can be joined end to end in any suitable manner, preferably by a bell and joint system similar to that used in the construction industry. Although steel piping can be used, it may cause problems with rust.

Referring again to FIG. 7, the ends of the gutter pipes 128 can be designed in any way such that the pig waste 124 within the first gutter system 126 is controlled adequately so that the pig waste 124 does not overflow the gutter pipes 128 or exit at the end of the gutter pipes 128 into an undesirable area such as directly into the building or the ground outside. In one embodiment, the ends of the gutter pipes 128 open into a cross gutter or trough 120 which is cut to fit into all the ends of the gutter pipes 128. In this way, the level of pig waste 124 will rise to about the same level throughout the first gutter system 126, as all of the gutter pipes 128 will be nearly level. Although any suitable fall within the first gutter system 126 is acceptable, in one embodiment the grade is about one (1) to two (2) inches per 100 feet of length. In a preferred embodiment as shown in FIG. 7, there are at least two first gutter systems 126, such that one such system is located under each row of pens 22, separated by a second gutter system 172.

As the manure 94 mixes with the urine 96 in the first gutter system 126, it begins to break up into smaller pieces. Although the first gutter system 126 can be emptied at any time which is convenient, even if it has only minimal pig waste 124 in it, preferably the first gutter system 126 is emptied when it is approximately one-half to two-thirds full of pig waste 124 or at any time when the level is such that flow of the pig waste 124 is obtainable. Although any suitable means for emptying the first gutter system 126 can be used, in one embodiment a plug 142 at one end of the first gutter system 126 is removed in order to allow the pig waste 124 to flow out through the hole or opening 143 into an inlet pipe 146. The opening 143 can be any suitable size, but is at least about 20 cm. (eight [81 inches) so that the flow is sufficiently fast to achieve a complete emptying of the first gutter system 126.

The opening 143 into which the plug 142 fits can be located at any suitable location within the first gutter system 126, including anywhere in the cross gutter 120, but is preferably located in the center of the cross gutter 120. The plug 142 is preferably a "stand up" pipe plug. In this way, if the first gutter system 126 overfills with pig waste 124 due to some type of emergency or equipment failure, the pig waste 124 will automatically overflow into the underground tank 148. If a failure of the climate controlled system within the building 20 occurs or extremely low temperatures otherwise cause the pig waste 124 in the first gutter system 126 to freeze, a suitable heater, such as a gas or electric heater can be used to thaw out the pig waste 124.

Once the pig waste 124 empties from the first gutter system 126, the plug 142 is replaced into the opening so that the first gutter system 126 can refill with pig waste 124 again. In one embodiment, the plug 142 is automated, such that it is automatically removed when the pig waste 124 reaches a certain level or a certain pressure is reached within the first gutter system 126. It can then be automatically returned when the first gutter system 126 has emptied. Any suitable level controller or pressure controller can be used for automating the emptying out of the first gutter system 126. Preferably the pig waste 124 is drained from the first gutter system 126 without having been left to stand for an extended period, in order to prevent significant decomposition or "self-digestion" from occurring.

The pig waste 124 flows through a pipe 146 which is of suitable size and material. Preferably the pipe 146 is made from PVC and is about 20 cm (eight [8] in.) in diameter. The pig waste 124 then flows into an underground tank or series of tanks 148. The size and number of tanks 148 is determined primarily by the needs of a given operation, and the volume of the first gutter system 126. In a preferred embodiment, there are two first gutter systems 126, each holding about 250 gallons, and two underground tanks 148 holding about 500 gallons each.

The tank 148 can be made from any suitable material, including concrete, but is preferably plastic, as plastic tanks are lightweight, economical and readily available. A suitable tank 148, for example, may be obtained from Peabody Engineering and Supply Co. of Gardena, Calif. or Norwesco Septic & Cistern plastic tank manufactured in St. Bonifacius, Minn. The tank 148 can also be of any suitable diameter, height, and volume for a given operation. In one embodiment, the tank 148 is Part No. 40182-A from Diehls of Dayton, in Dayton, Iowa, such that the diameter is about 1.4 meters (54 inches) and the height is about 1.3 meters (51 inches). Although the tank 148 can be located in any suitable area, preferably the tank 148 is located under the cross gutter 120. The tank 148 is preferably buried deep enough so that it (or a portion thereof) is below the frost line to prevent the pig waste 124 from freezing. In the Midwest, the frost line is approximately 1.2 meters (four [4] feet) below ground-level. In the Midwest, therefore, the tank 148 can be buried about 1.5 meters (five [5] feet) below ground-level such that at least the lower 30 cm (one [1] ft.) of the tank 148 is below the frost line. The tank 148 can also be buried further below the frost line, if desired. Alternatively, the tank 148 can be buried deeper or shallower or can even remain above ground if desired. In such cases it may be necessary to employ a suitable heater in or near the tank to keep the pig waste 124 from freezing. In warmer climates, the tank 148 will likely not need to be buried and can remain above ground with a suitable heater if necessary.

Figure 8:
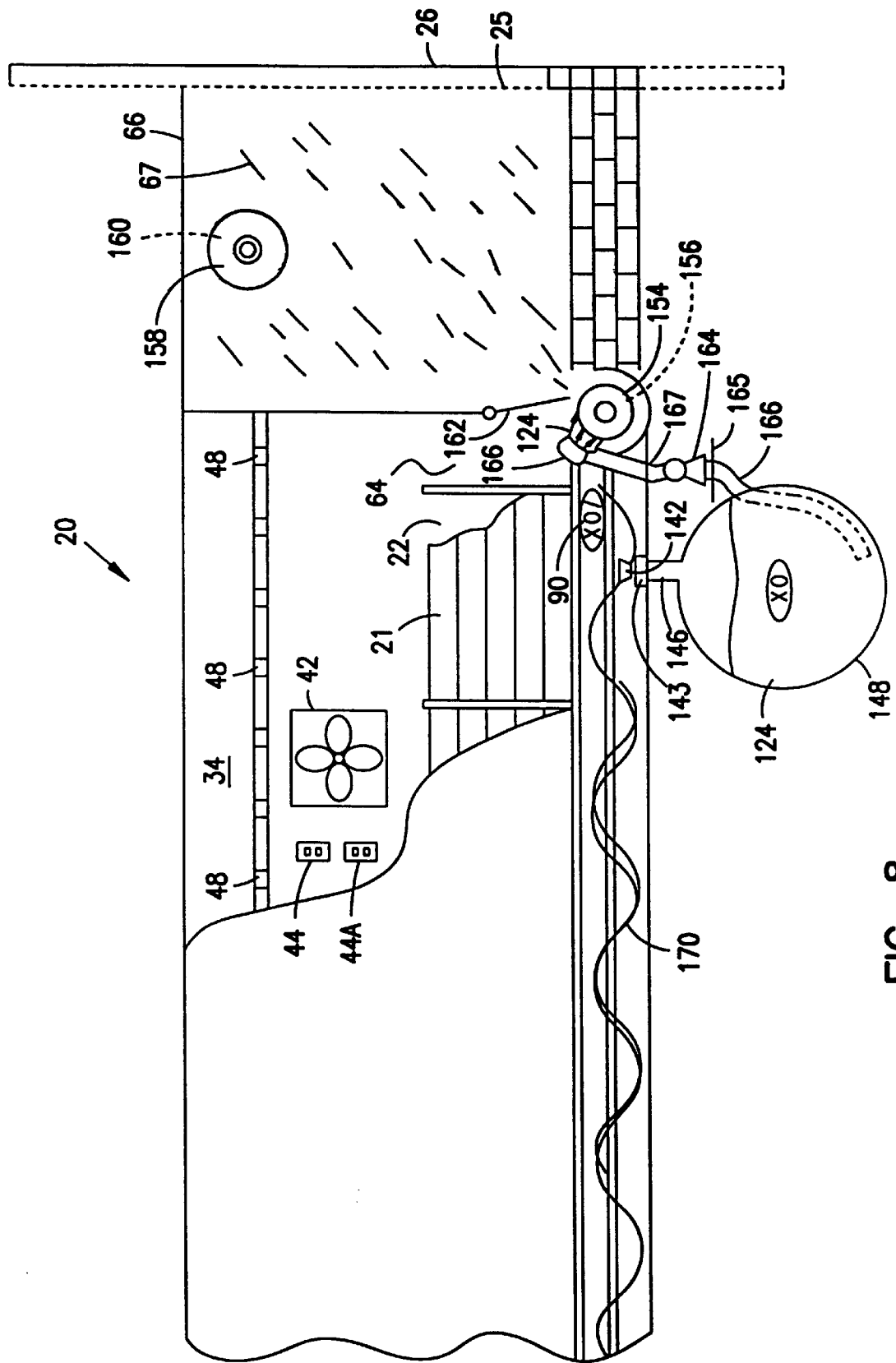
FIG. 8 is a simplified cut-away side view of the building (including bin) and one waste storage tank in one embodiment of the present invention.

As shown in FIG. 8, the bin 66 is located nearby the tank 148, preferably at the same end of the building 20 as the tank 148. More preferably, the bin 66 is contiguous with and a part of the building 20 itself. In a preferred embodiment there are two tanks 148 underneath each row of pens 22. The bin 66 is more preferably located above the tank or tanks 148, but not over the inlet pipe 146 to the tank 148. The bin 66 can be any suitable shape and size depending on the size of the hog operation. In one embodiment the bin 66 is about 2.4 meters (eight [8] feet) in width, about six meters (20 ft.) in length, and about three (3) meters (ten [10] ft.) high. The exterior walls 26 of the bin 66 can be made from any suitable material, but are preferably made of the same material as the exterior walls 26 of the main portion of the building 20. Although any material such as dimension lumber covered with plywood can be used for the interior walls 25 of the bin, such material is likely to cause the contents within the bin 66 to "hang up" on the sides. Preferably the interior walls 25 of the bin 66 are covered with the same material that the interior walls 25 of the remainder of the building 20 are made, such as plastic or fiberglass which is smooth to eliminate any such problems.

The bin 66 can be loaded with any suitable ground fibrous material 67 including, but not limited to sawdust, ground corn stalks, straw, newspaper, wood shavings, ground straw from small grains such as oats, and so forth. Preferably the ground fibrous material 67 has been finely ground before being placed in the bin 66. The ground fibrous material 67 can also be checked for moisture content by taking a small sample and determining its moisture content or moisture balance with suitable equipment which can detect moisture and temperature. The ground fibrous material 67 can be loaded into the bin 66 in any suitable manner, but is preferably loaded by auger, conveyor or tractor loader through a suitable opening near the top of the bin 66. The opening can be any shape and size such as a rectangle or square, but is preferably a pentagon shape such that the top of the opening follows the line of the roof and it is large enough to allow a loader to fully dump a load inside. More preferably the opening is protected with a suitable door. In one embodiment, the door is connected to the bin 66 by chains, such that it can open downwards, similar to the back end of a pick-up truck.

There are preferably one or more leveling augers 158 (and 160 shown in FIG. 9) located near the top of the bin which help to level the ground fibrous material 67 within the bin 66 and prevent the ground fibrous material 67 from "coning up" in the middle. In a preferred embodiment the leveling augers 158 (and 160) are positioned end to end and turn in opposite directions towards the center of the bin 66. In this way, the ground fibrous material 67 can fall freely down towards the bottom of the bin 66.

The ground fibrous material 67 in the bin 66 is mixed with the pig waste 124 in the tanks 70 by activating a first bin blending conveyor 154 (and a second bin blending conveyor 156 shown in FIG. 9) positioned end to end, and turning in opposite directions towards the center of the bin 66. In this way, the pig waste 124 and ground fibrous material 67 are gradually moved towards the center of the bin 66 and towards the first center blending conveyor.

In one embodiment, the first and second bin blending conveyors 154 and 156, respectively, are both located under the bin 66, preferably on the floor of the bin 66 towards the front. In this way, the first and second bin blending conveyors 154 and 156 essentially become a "live bottom" for the bin 66. Although any suitably sized conveyors 154 and 156 can be used, preferably the first bin blending conveyor 154 is shorter than the second bin blending conveyor 156 to allow for the width of the central blending conveyor 170 which extends into the bin 66 between the first and second bin blending conveyor 154 and 156. The first and second bin blending conveyors 154 and 156 can be designed in any suitable way which will accomplish the desired mixing and movement. The shaft and paddles of the first and second bin blending conveyors 154 and 156 are of a suitable size and shape so that the fibrous material 67 can be moved and mixed adequately to achieve the desired result. In one embodiment, the "paddles" attached to the shaft of the first and second bin blending conveyors 154 and 156 are curved. In another embodiment, the paddles are spoon-shaped. In yet another embodiment, the paddles are flared on the edges.

Therefore, the first and second bin blending conveyors 154 and 156, respectively, are essentially "auger-like" devices which mix up the ground fibrous material 67 with the pig waste 124. Unlike conventional augers, however, which are typically vertical and are designed to move material along without mixing it, the first and second bin blending conveyors 154 and 156, respectively, are oriented horizontally and turn much slower than typical augers such that the ground fibrous material 67 and pig waste 124 are mixed together very slowly and thoroughly. In one embodiment, the first and second bin blending conveyors 154 and 156 are tuning at a rate of about five (5) to ten (10) revolutions per minute.

The bin 66 can be further equipped with a swinging door 162 which is preferably located near the bottom of the bin 66 and accessible from inside the building 20 from within the work space 64. More preferably, the swinging door 162 is near the center of the first and second bin blending conveyors 154 and 156. In this way the flow of ground fibrous material 67 into the first and second bin blending conveyors 154 and 156 can be controlled and the bin 66 can be closed off when needed.

When the first and second bin blending conveyors 154 and 156 are activated, the ground fibrous material 67 within the bin 66 falls into the first and second bin blending conveyors 154 and 156 by gravity. The first and second bin blending conveyors 154 and 156 are activated at about the same time as pig waste 124 starts to be sprayed from the tank or tanks 148 by a suitable pump or pumps 164 into the first and second bin blending conveyors 154 and 156. The pump 164 is preferably located on a suitable platform 165 accessible from above, in the area of the work space 64 which has removable flooring. In one embodiment the system operates on a timer such that when the first and second bin blending conveyors 154 and 156, respectively, are activated, the pump 164 is also timed to turn on at about the same time. Preferably the pig waste 124 is mixed with the ground fibrous material 67 soon after being drained from the first gutter system 126 in order to avoid significant decomposition or "self-digestion." In one embodiment, the pig waste 124 is sprayed within days of being collected directly onto the first bin blending conveyor 154 and the second bin blending conveyor 156. In this way, the ground fibrous material 67 within the bin 66 falls into the first and second bin blending conveyors 154 and 156 by gravity at about the same time as pig waste 124 is being sprayed into the first and second bin blending conveyors 82, respectively, from the tank 148 by the pump 164. In one embodiment the system operates on a timer such that when the first and second bin blending conveyors 154 and 156, respectively, are activated, the pump 164 is also timed to turn on at about the same time.

The pump 164 is preferably a slurry pump, which can agitate and pump the pig waste 124 out of the tank 148 through a tank tube 166, and into the first and second bin blending conveyors 154 and 156 through a bin tube 167 which preferably has a suitable sprayer or spray head 169 at the end. Suitable pumps 164 are commonly referred to as "trash" or "fertilizer" pumps, but are basically slurry pumps which are designed to handle viscous material, essentially "chopping" the waste much as a sink waste disposal operates. Any suitable horsepower and inlet and outlet size can be used, but preferably the pump 164 is about a one (1) to two (2) HP pump with at least about a 7.6 cm (three [3] in.) inlet and outlet.

The pig waste 124 and the ground fibrous material 67 begin mixing in and near the first and second bin blending conveyors to form a ground fibrous waste mixture or mash 90. The moisture content of the mash 90 will likely vary from operation to operation, but preferably the mash 90 has a moisture content of about 50 to 70% and is essentially free of large chunks such that it resembles a slush.

Figure 9:
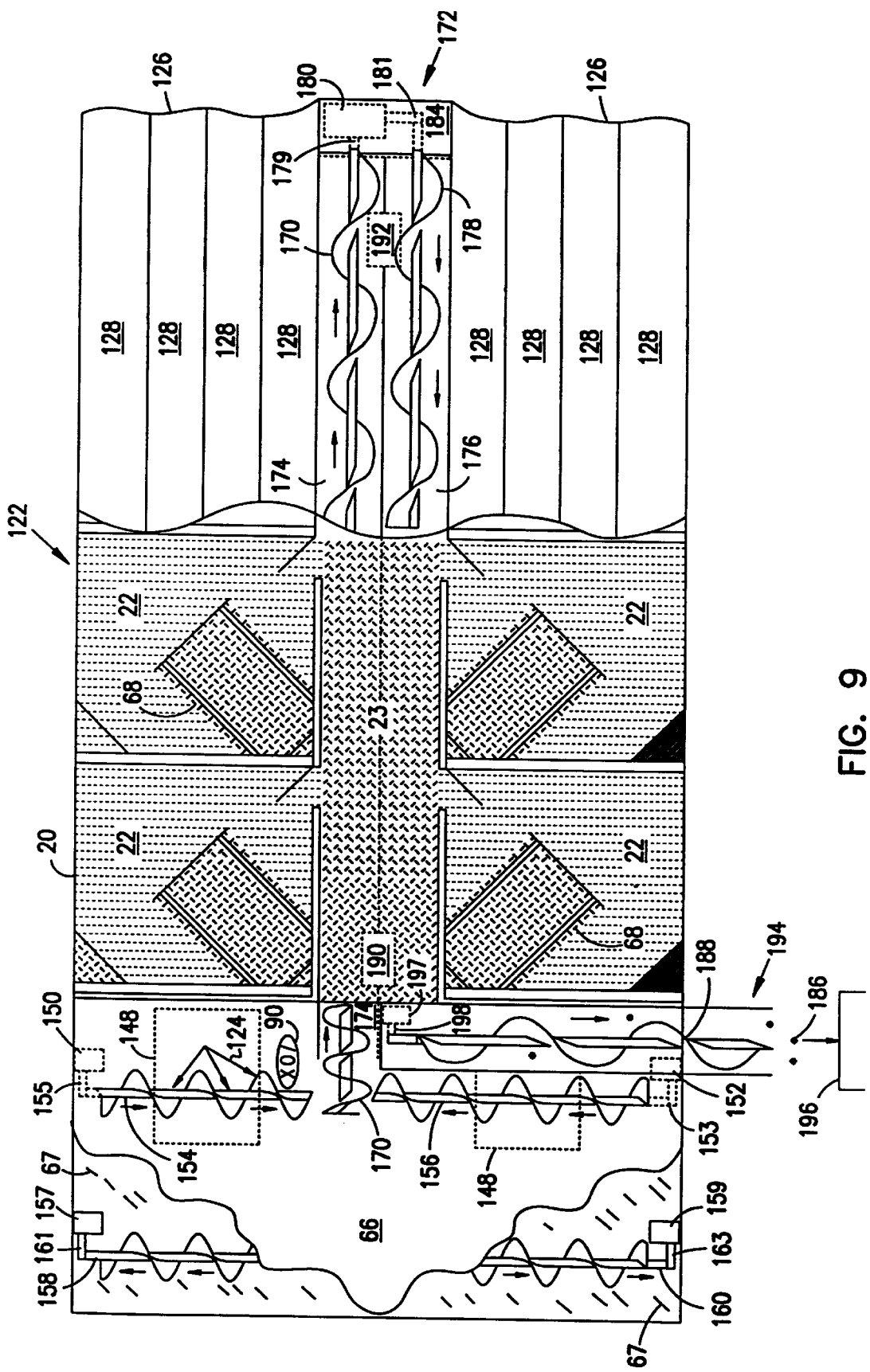
FIG. 9 is a simplified cut-away top view of one embodiment of the waste management system of the present invention.

As shown in FIG. 9, the first and second bin augers 158 and 160 near the top of the bin 66 are turned by motors 157 and 159, respectively attached to suitable shafts, 161 and 163, respectively. The first and second bin blending conveyors 154 and 156 are also each attached to a suitable motor 150 and 152, respectively, by a suitable shaft 155 and 153, respectively. The first and second bin blending conveyors 154 and 156, respectively, move the mash 90 towards the first central blending conveyor 170 located in the second gutter system 172. As shown in FIG. 9, preferably there are two tanks 148 located underground on each side of the building 20.

The second gutter system 172 is preferably comprised of at least one first central gutter 174 and at least one second central gutter 176. The first central blending conveyor 170 is located in the first central gutter 174 which preferably runs the nearly the full length of the building 20 and operates to move the mash 90 towards the end of the building 20 opposite from the bin 66 and tank 148. The second central blending conveyor 178 also preferably runs the approximate length of the building 20 and is located in the second central gutter 176. The second central blending conveyor 178 turns in the opposite direction to move the mash 90 in the opposite direction from the first central blending conveyor 170. The entire second gutter system 172 is preferably located beneath the service aisle 23.

The second gutter system 172, and thus the first and second central blending conveyors 170 and 178 are preferably at approximately right angles to the first and second bin blending conveyors 154 and 156. As stated above, the first central blending conveyor 170 preferably extends into the area of the bin 66 between the first and second bin blending conveyors 154 and 156 so that the mash 90 in the bin 66 can be picked up and moved into the second central gutter system 172. In one embodiment, the first central blending conveyor 170 is at approximately the same height as the first and second bin blending conveyors 154 and 156. In another embodiment, the first central blending conveyor 170 is lower than the first and second bin blending conveyors 154 and 156 such that the mash 90 drops into the first central blending conveyor 170 housed in the first central gutter 174.

The second gutter system 172 comprises at least one pipe and preferably two pipes cut in half, which are about the same size and shape of the pipes in the first gutter system 126. In a preferred embodiment, the second gutter system 172 comprises a first center pipe 174 and a second center pipe 176 cut in half and each fastened together in the same way as the pipes 128 in the first gutter system 126 (shown in FIG. 7A). The first and second central blending conveyors 170 and 178 are each connected by a suitable shaft 179 and 181, respectively, preferably to only one motor 180 in a suitable location, although more than one motor can also be used.

In a preferred embodiment, the first and second central blending conveyors 170 and 178, respectively, are parallel to each other and connected at one end with a suitable connecting pipe 184. In this way, as the mash 90 exits the first central blending conveyor 170 it is pushed through the connecting pipe 184 and into the second center central blending conveyor 178 which is turning in the opposite direction from the first center central blending conveyor 170.

Preferably the motor 180 is a variable speed motor so that the speed can be varied to accommodate the various thicknesses or viscosities of the mash 90 in each batch. A typical motor is a DC motor having a variable speed of about zero to 100 revolutions per minute. The motor 180 can be turned on and off by hand, but is preferably controlled by a suitable timing device. In one embodiment, a timing device from Fischer Controls in Marshalltown, Iowa is used. The motor speed should be slow enough so that the mash 90 remains in the second gutter system 172 for a time sufficient to throughly mix the mash 90 so that it eventually becomes a suitable end product material 186. In one embodiment, the first and second central blending conveyors 170 and 178 are turned about 20 to 30 times per minute. It is also possible that the motor 180 will turn each central blending conveyor 170 and 178 at speeds which are different from each other, or at varying speeds throughout the composting process. It is likely the mash 90 will only move a few feet each day, as it is slowly composting. It is estimated that this process will take at least one day, but can take as much as seven (7) to ten (10) days or more. In an alternative embodiment, the motor 180 is turned off so that the mash 90 is allowed to sit for a period of time without being moved during the composting process. Specifically, when the mash 90 is allowed to remain in one place, composting will still be occurring as the material will heat up and continue to degrade as described below. For example, the first and second center central blending conveyors 170 and 178 can be turned off for about five (5) minutes per hour per day. In yet another alternative embodiment, the mash 90 is turned at least about one (1) to five (5) times per hour, more preferably about two (2) to four (4) times per hour.

The first and second central blending conveyors 170 and 178 must be designed so that they can adequately turn in the mash 90. In one embodiment, the first and second central blending conveyors 170 and 178 are auger-like devices similar to the first and second bin blending conveyors 154 and 156 described above. However, these units differ from the first and second bin blending conveyors 154 and 156 in that they are more "stretched" out such that the pitch and/or frequency of the blades of the blending conveyors 170 and 178 provide greater spacing between the consecutive blades at their extremities. Preferably, the design includes a turning edge which can be flared, spoon-shaped, curved, or other design that lifts and mixes or turns the mash 90 as it turns. In this way, the mash 90 is slowly moved while it is being mixed.

Figure 10C:
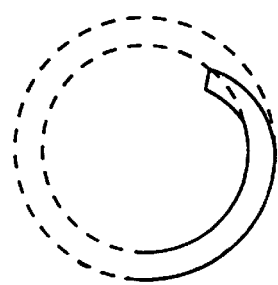
FIGS. 10A–10C are end simplified views of the central blending conveyor in three different positions in one embodiment of the present invention.
Figure 10B:
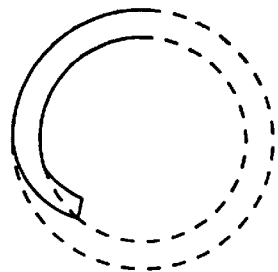
Figure 10A:
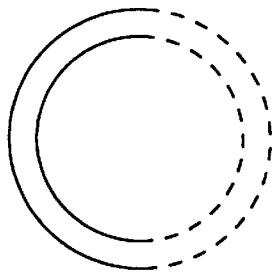
Figure 10:
FIG. 10 is a simplified top view of a central blending conveyor in one embodiment of the present invention.

FIG. 10 is a side view of one embodiment of the first and second central blending conveyors 170 and 178 of the present invention in which the paddles are "spoon-shaped." FIGS. 10A–10C are simplified end views of a "spoon-shaped" paddle in three different positions as it is rotated 360° during use.

Figure 11C:
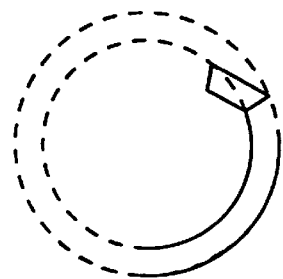
FIGS. 11A–11C are simplified end views of the central blending conveyor in three different positions in an alternative embodiment of the present invention.
Figure 11B:
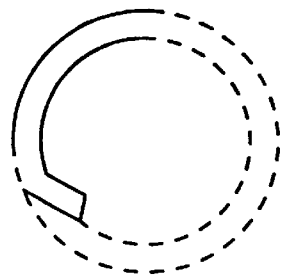
Figure 11A:
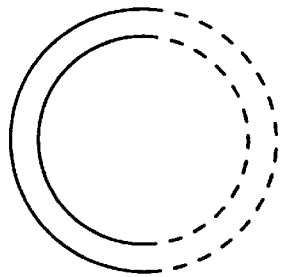
Figure 11:
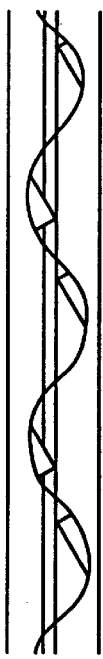
FIG. 11 is a simplified top view of a central blending conveyor in an alternative embodiment of the present invention.

FIG. 11 is a side view of an alternative embodiment of the first and second central blending conveyors 170 and 178 of the present invention in which the paddles are "flared." FIGS. 11A–11C are simplified end views of a "flared" paddle in three different positions as it is rotated 360° during use.

It is generally known that for composting to occur, air must be allowed to circulate, which is provided for in the present invention by the slowly turning central blending conveyors. U.S. Pat. No. 5,501,718 to Bandurski, which is hereby incorporated by reference, teaches the various factors to consider when composting of manure is desired. Although Bandurski teaches an off-site batch process, the need to monitor the moisture content of the fibrous material prior to composting as well as monitoring other parameters during and after composting, are applicable. Suitable heat detection and moisture detection devices are used. In one embodiment, these devices are obtained from Fischer Controls in Marshalltown, Iowa.

The first and second bin blending conveyors 154 and 156, as well as the first and second central blending conveyors 170 and 178 also help to break down the pig waste 124 and ground fibrous material 67 which improves the efficiency of the decomposition process. The decomposition process in the present invention refers to the phenomenon of biological decay or putrefaction, which is caused by microorganisms. Nitrogen is also important for composting and is provided in the pig manure. As a result, heat is generated which further facilitates the rotting or decomposing of organic matter, and also may kill undesirable organisms as well as weed seeds. The first and second central blending conveyors 170 and 178 are preferably located below the service alley or center aisle 23, and covered with a suitable covering such as plastic or aluminum deckplate so that the caretakers are protected and so that heat and steam can build up to allow the pig waste to decompose into a nutrient-rich substance known as compost. A suitable number of vents are also provided to allow for release of water vapor and other gases in the second gutter system 172. In the embodiment shown in FIG. 9, there are two vents 190 and 192 located on opposite ends of the second gutter system 172.

In one embodiment, there are no additives added to the mash 90 during the composting process. However, the mash 90 is preferably periodically tested as it progresses through the central gutter system 172 primarily to ensure that adequate composting is taking place. Specifically, the mash 90 can be tested for viruses, bacteria, weed seeds, as well as nitrogen, phosphorous, potash content, and so forth. If appropriate, one or more additives can then be added to the mash 90 to hasten the composting process itself. In such an alternative embodiment, the additives include, but are not limited to microbes and enzymes.

Figure 9A:
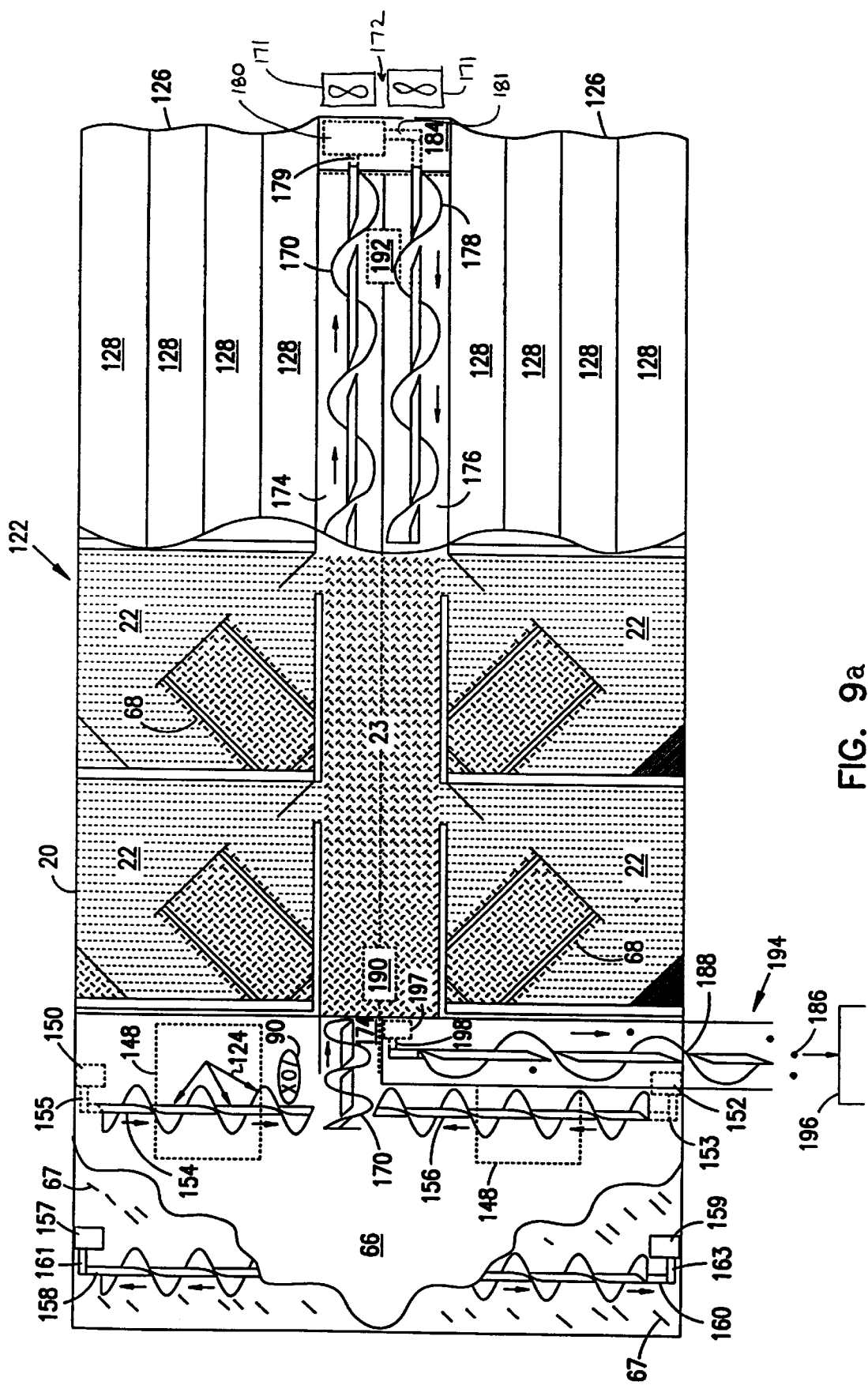
FIG. 9A is a simplified cut-away top view of one embodiment of the waste management system of the present invention, including a fan for blowing air or oxygen in a second gutter system.
Figure 9B:
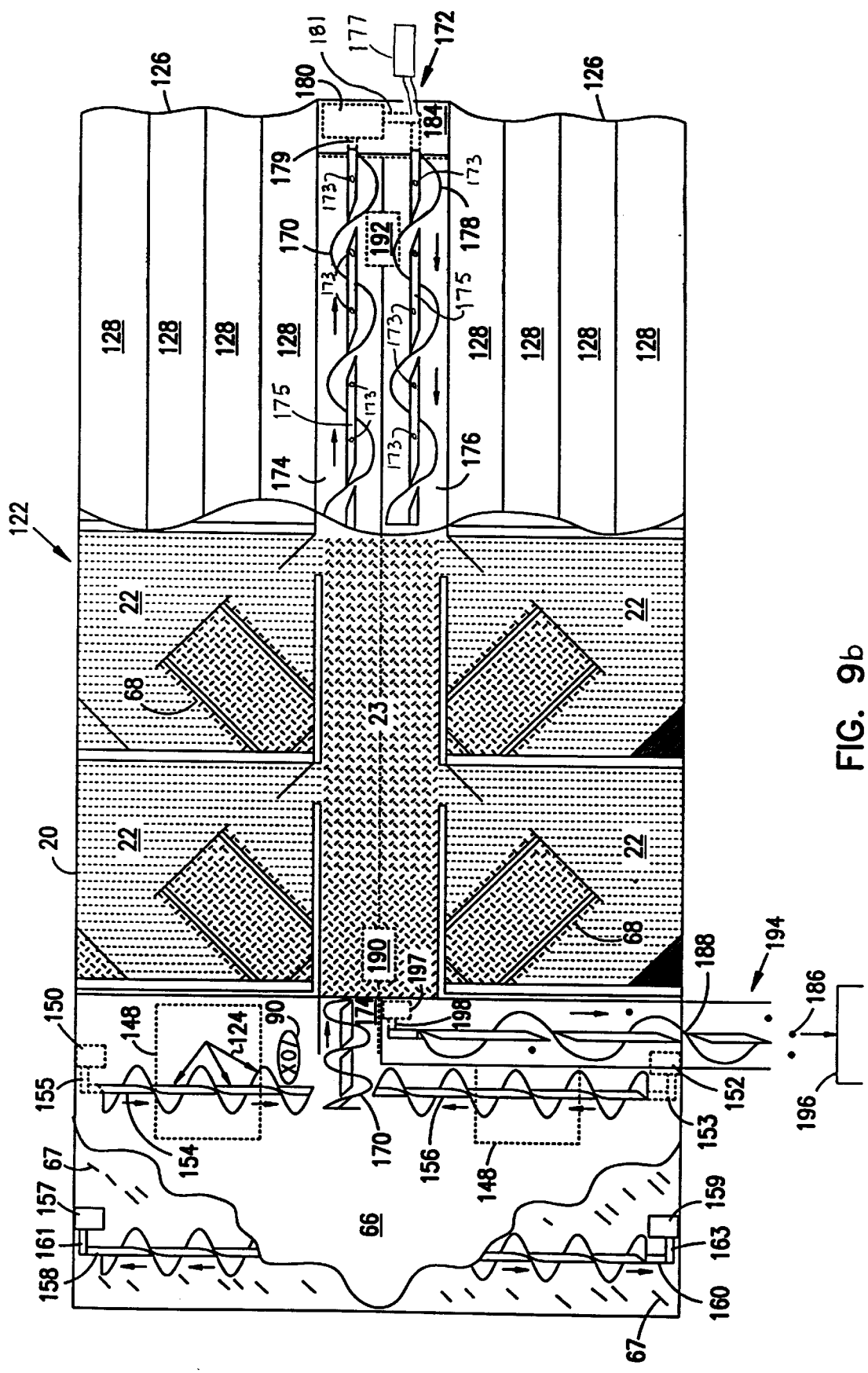
FIG. 9B is a simplified cut-away top view of one embodiment of the waste management system of the present invention, including means for mixing a gas with the mash through a central blending conveyor.

In another embodiment, shown in FIG. 9A, air can be added to the mash 90 through the use of suitably located fans 171 within the second gutter system 172 in order to speed up the composting process if desired. Preferably, pure oxygen may be used instead of air in order to accelerate the composting process even more. In another alternative, shown in FIG. 9B, air or oxygen can be added to the mash 90 through orifices 173 provided in the central rods 175 of the blending conveyors 170, 178.

In yet another alternative embodiment, light can be added to speed up the composting process through use of directed sunlight or suitable artificial lighting. It is also possible to use a combination of microbes, enzymes, air and light, as well as other liquid, solid, or gaseous additives as each operation warrants, depending on the need to hasten composting, end product 186 desired, as well as on various other factors including, but not limited to time and cost constraints.

The end product 186 exits the second central blending conveyor 178 as material suitable for use in agriculture or gardening. Preferably, the end product 186 is drawn by the second central blending conveyor 178 out of the building 20 through a finishing blending conveyor 188. The finishing blending conveyor 188, which is located in an outer gutter system 194, is driven by a suitable motor 197 attached to a shaft 198. Preferably the end product 186 is transported to an adjoining building 196 where it is tested for adequate composting as well as for nitrogen, phosphorus and potash, and so forth. In this way, a determination can be made as to the best use for the end product 186, such as agricultural fertilizer or garden potting soil.

It is also possible for the entire waste control system 122 to be automated. This can include equipping the first gutter system with a suitable level sensor as described above, such that when the pig waste reaches a certain level, the first gutter system is emptied through a suitable opening. This waste removal can be accomplished by sending a signal from a suitable controller to automatically remove a plug, or open a hatch, or otherwise automatically create a suitable opening through which the waste can flow through a pipe and into the underground tank or tanks. This flow of the pig waste can, in turn, activate a suitable sensor in the tank, such as a level or flow control sensor, to send the appropriate signals to a controller to turn on the system blending conveyors, blending conveyor motors, and pump or pumps, so that the pig waste is pumped into the fibrous materials in the central blending conveyors and the composting process can begin.

The end product may be humus having a nitrogen, phosphorous and potassium content of about one (1) to three (3) % (by weight or volume as commonly used for potassium content evaluation in the fertilizer and potting soil trade), depending on the content of the starting materials. Humus typically contains varying amounts of proteins and certain uronic acids which are combined with lignins and their derivatives. Such humus can be useful as potting soil or fertilizer, depending on the exact composition. It is also possible to blend the end product with one or more additives to produce a wide array of useful products for gardening and agriculture. For example, compost from different sources can be added if necessary, such as from poultry, cattle or other sources. Poultry compost is typically highly potent as it is very high in nitrogen content, while the compost from cattle operations is weakly potent.

It is also possible, with appropriate additives, to use the end product 186 as a feed base for feed for livestock, including but not limited to cattle, pigs, sheep, goats, laying hens, broilers, turkeys, and so forth. For example, with the addition of suitable grains, vitamins and/or minerals, the end product 186 can become a complete diet for livestock, providing necessary roughage as well.

The testing for adequate composting involves testing of several components. As stated above, it is important that the end product 186 be tested for weed seed. This can be accomplished by attempting to grow weed seeds which may be present in the end product 186. Weed seed content, as well as bacteria content can also be tested by sending a sample to a suitable testing laboratory, such as at Iowa State University in Ames, Iowa. If the end product 186 contains greater than a trace of weed seed or a trace of bacteria the end product 186 can be sent through the waste management system 122 again, and composted at the same speed as it was previously composted at, or slower, or faster as the situation warrants. A trace is defined as an amount which is not necessarily harmful for the intended use of the end product 186.

The nitrogen, phosphorous and potash content can also be determined with suitable detection devices. In one embodiment testing devices from Farm Home Offices in Vinton, Iowa can be used to determine the various component levels. For example, the test kit includes an acid-proof plastic tube with nitrogen, potash and potassium meters, measuring tube for manure and water, chemical reagents and scoop. When the instructions are followed, various chemical reactions occur which aid in determining the desired component levels. It is also possible to perform a pH test to determine whether the end product 186 is at a suitable pH. In one embodiment the pH is around seven (7) so that the end product 186 is essentially neutral. If necessary, the pH can be adjusted by any suitable means. In one embodiment, the pH is adjusted with a suitable base such as calcium hydroxide in the form of diamataceous earth. The diamataceous earth also acts as a drying agent as it holds more than its own weight in water and also possesses insecticidal properties which can be useful in agriculture and gardening. Diamataceous earth is easily mined in many areas, and can be mined on-site. Alternatively, diamataceous earth can be purchased commercially under the trade names of Celite, Clarcel, Chromosorb, Dicalite, Tamms 680 Multicel and the like.

It is expected that the end product 186 will contain about two (2)% nitrogen, two (2)% phosphorus, and two (2)% potash by weight or volume as commonly used for nitrogen, phosphorus and potash content evaluation in the fertilizer and potting soil trade, although these amounts can vary considerably, depending on which animal provides the waste and on the type of feed which has been consumed by the animal. Depending on the levels of nitrogen, phosphorus and potash, the end product 186 can be used for agricultural fertilizer or potting soil. The end product is useful as a fertilizer if the nitrogen content is above about two (2)% by weight or volume. Furthermore, the levels of the various components will determine the amount of fertilizer or potting soil required for a given situation. Therefore, it is important to properly label each batch of end product 186 so the customer is aware of the levels of nitrogen, phosphorus and potash. This information, together with soil tests on a given acreage, the crop to be planted will be useful in determining how much fertilizer is needed for a given operation. The amateur or professional home gardener can also use this information together with information on the nutrients otherwise available in the soil to be used and the type of plant to be planted (vegetable, fruit shrub, tree, decorative plant or flower) to determine how much potting soil is needed for a given situation.

Further, in order to be used for potting soil, the end product 186 must be relatively dry such that it has a moisture content of less than about 50% by weight, preferably between about 40% and 50% by weight. As discussed above, the potting soil must also be relatively free of live weed seed and harmful bacteria such that not more than a trace is contain therein. It is also desirable that an end product 186, such as potting soil, not develop a "manure-like" smell during use, including during or after watering. This feature is desirable for most uses, but is particularly advantageous when the potting soil is being used inside homes, greenhouses and the like.

Remedies can include reprocessing or addition of suitable additives to remedy the particular problem. The nitrogen, phosphorous and potash levels must also be appropriate for the desired usage. The potting soil can be packaged in water tight bags or boxes.

Although the cost of producing potting soil or field fertilizer is initially more expensive than allowing manure to run onto the ground or into conventional pits and lagoons, the generation of a useful end product will more than offset initial start-up costs. Specifically, it is estimated that the potting soil or field fertilizer of the present invention can likely sell for about $5.00 to about $8.00 per cubic meter at a minimum, and about $13.00 per cubic meter as an average, with the possibility of selling the end product for as high as $40.00 per cubic meter. Such costs are comparable with the costs for a mixture such as sphagnum peat moss, vermiculite materials, and commercial fertilizers. Further, the waste management system 122 of the present invention does not require the extremely high costs involved with the emptying of pits or lagoons. Specifically, such pits and lagoons are typically emptied by commercial liquid manure handlers using expensive equipment and labor.

The waste management system of the present invention has the further advantage of protecting and enhancing the environment. For example, in one embodiment having forty sows and about a forty acre cornfield, corn stocks from the field can be ground and used as the ground fibrous material for mixing with the waste from the forty sows and all of the offspring. After being processed according to the present invention, the manure and corn stocks can be returned to the environment to produce yet another corn crop. In this way, there is no need to hire expensive liquid manure haulers as is needed currently. Further, as there is no need to add additional commercial fertilizers, the environment is truly protected and enhanced.

The one-step system of the present invention with the preferred embodiment of a forty sow operation is designed to make pig raising more attractive for the smaller farm operation by reducing labor requirements. Although, the operator still needs to clean up a pen before each new farrowing, the time required to move every pig a minimum of about three times and clean up following each move is completely eliminated in the one-step system described herein. It is recognized that a pig may need to be "moved" or otherwise removed from the pen after its birth and prior to achieving market weight in order to receive veterinary care, to be visually observed or examined, to be held or touched, and so forth. The present system provides for the first time, however, the means to farrow and raise a pig in one location such that the pen is home for the pig from birth to market.

The "unused labor" resulting from the use of the one-step method allows the farmer to sell the market pigs at a higher profit margin. It is estimated that the time saving per market pig produced may be about one (1) to about 1.25 hours, which translates into a savings of about $6.00 to about $13.00 per market pig produced, depending on wages. It is also possible to convert the unused labor to additional profit-producing activities further adding to the economical benefits of the one-step system. Since the one-step system of the present invention may keep the pigs healthier and allow them to grow faster, additional economic benefits may also be possible by reducing the time it takes a pig to reach market weight. These savings and profits do not include the additional profits discussed above which are available with marketing and selling the end product produced from the one-step system.

The one-step system of the present invention has the advantage of providing a sanitary, humane, efficient and economical method for raising pigs. Furthermore, as discussed above, the pigs being reared in one pen according to the present invention will reach their market weight faster than with traditional operations in which the pigs are moved repeatedly during their various stages of growth. Specifically, with the traditional method, the period from birth to market is about 150 days, whereas with the one-step method of the present invention, this period may be reduced by as much as about seven (7) to twenty-one (21) days because of the reduced stress, including reduced exposure to viruses and bacteria. Additionally, the waste control system of the present invention not only reduces odor problems and creates a cleaner environment in which to house and raise pigs, it recycles the pig waste into useful products for agricultural and gardening uses.

Although the present invention has been described in considerable detail with reference to certain preferred versions thereof, other versions are possible. For example, although the waste control system of the present invention has been described in terms of a hog operation, it is also applicable to any other type of livestock operation, including, but not limited to, cattle, sheep, poultry, and so forth. Furthermore, it is possible to purchase all or some of the components described herein as kits separately packaged having the needed materials and instructions, i.e. instruction means, describing how to assemble the entire preferred building, including the cooling and ventilation system and waste management system as described herein. Alternatively the kits can contain the materials and instructions for assembling one or more individual components of the building, such as the farrowing stall, pen, pig hover, feeding areas, first and second gutter systems, and so forth. Suitable instruction means include printed labels, printed package inserts, tags, video or audio tapes and the like. Suitable packaging means include shrink wrap, bubble wrap, strapping, plastic or paper bags, boxes and the like. The present invention can also include kits which contain most, but not all, of the required materials. In such cases the other materials, such as sand and fibrous material for mixing with pig waste would not be included, but instructions on a suitable amount of sand and fibrous material, as well as a suggested depth for the sand, can be given. For other components which are not included in the kits, suggestions can be given for the type of components needed or where certain components can be obtained. This can include components such as the water tanks, waste tanks, pumps, motors and fans, for example. The instructions can also state how to hook up to components or systems already in place, such as existing water supplies and so forth. The instructions can further state what tools are needed for assembly such as a hammer, screwdriver, drill and the like, although other smaller tools, such as allen wrenches can be provided if needed. The kits can also include the materials and instructions for performing the needed testing for the end product with information on alternative courses of action to take if the results are outside desired ranges for various components. In these types of kits, suitable packaging materials for the materials include bottles, vials and the like. Therefore, the spirit and scope of the appended claims should not be limited to the description of the preferred embodiments contained herein.

What is claimed is:

1. A process for raising pigs in one location from birth to market comprising the steps of:
   farrowing and raising a litter of pigs in one pen, the pen located inside a building having a roof;
   placing a sow or gilt in a pen having fiberglass or aluminum slats;
   moving the sow or gilt to a farrowing stall located in the pen prior to giving birth to a litter of one or more pigs, wherein the movement of the sow is restrained for a period of time;
   leaving the litter of pigs in the pen until market weight is achieved whereby the litter of pigs is born and raised in one pen;
   pumping pig waste into one or more blending conveyors having fibrous material to form a mash; and
   composting the mash in the one or more blending conveyors to produce an end product useful in gardening or fanning.

2. The process according to claim 1, further comprising the step of adding a gas to the mash in the one or more blending conveyors during the composting step to speed up the composting process.

3. The process according to claim 2, wherein the gas is air.

4. The process according to claim 2, wherein the gas contains a high concentration of oxygen.

5. The process according to claim 2, wherein the one or more blending conveyors have a hollow central rod for carrying the gas to the mash.

6. The process for raising pigs as recited in claim 1 further comprising collecting pig waste in one or more gutter systems located below the fiberglass or aluminum slats.

7. The process for raising pigs as recited in claim 6 further comprising storing the pig waste in one or more tanks for a period of time.

8. The process for raising pigs as recited in claim 7 wherein the one or more tanks are located underground.

9. The process for raising pigs as recited in claim 1 further wherein composting occurs when the pig waste and fibrous material are mixed and transported in one or more blending conveyors.

10. The process for raising pigs as recited in claim 9 further wherein the one or more blending conveyors are located under a center aisle, the center aisle located between two rows of pens.

11. The process for raising pigs as recited in claim 1 further comprising venting the mash whereby heat and gases are released.

12. The process for raising pigs as recited in claim 1 further comprising adding one or more additives to the mash whereby composting is hastened or the end product content is altered.

13. The process for raising pigs as recited in claim 1 further comprising:
   using a cooling room located on top of the roof, the cooling room having fibrous material into which fresh air is drawn;
   pumping water from one or more water tanks, the water tanks located on top of the roof, into the fibrous material wherein the fresh air is cooled to produce cooled air;
   raising and lowering curtains surrounding the cooling room in response to a setting on a thermostat or humidistat; and
   using one or more fans to draw the cooled air first into the building through one or more slots in a plenum chamber and then out of the building whereby the building is cooled and ventilated.

14. The process as recited in claim 13 wherein foul air from one or more pens is drawn by the one or more fans out of the building.

15. The process as recited in claim 13 wherein the one or more water tanks provides water to the pigs by gravity flow.

16. A process for managing livestock waste on-site comprising the steps of:
   pumping livestock waste and fibrous material into one or more blending conveyors; and
   composting the livestock waste and fibrous material in the one or more blending conveyors to produce an end product useful in gardening or farming.

17. The process for managing livestock waste as recited in claim 16 further comprising collecting livestock waste in one or more gutter systems located below the fiberglass or aluminum slats.

18. The process for managing livestock waste as recited in claim 16, further comprising the step of adding a gas to the livestock waste and fibrous material in the one or more blending conveyors during the composting step to speed up the composting process.

19. The process for managing livestock waste as recited in claim 18, wherein the gas is air.

20. The process for managing livestock waste as recited in claim 18, wherein the gas contains a high concentration of oxygen.

21. An apparatus for raising pigs comprising a blending conveyor for composting pig waste, wherein an end roduuct useful in gardening or farming is produced by blending the pig waste with a fibrous material without diluting the pig waste or separating the pig waste into separate components, the apparatus also including means for mixing a gas with the pig waste and fibrous material in the blending conveyor.

22. The apparatus according to claim 21, wherein the means for mixing is a fan.

23. The apparatus according to claim 21, wherein the means for mixing is a series of orifices formed in a hollow central rod of the blending conveyor.

24. The apparatus for raising pigs as recited in claim 21 further comprising a container for storage and addition of one or more additives into the pig waste and fibrous material whereby composting is hastened or the end product content is altered.

25. The apparatus according to claim 21, wherein the gas contains a high concentration of oxygen.

26. An apparatus for raising pigs comprising a blending conveyor for composting pig waste, wherein an end product useful in gardening or farming is produced by blending the pig waste with a fibrous material without diluting the pig waste or separating the pig waste into separate components, the apparatus for raising pigs also including:

one or more pens for retaining pigs;

a roof over the pens;

a cooling room located on top of the roof, the cooling room having fibrous material into which fresh air is drawn;

one or more water tanks, the water tanks located on top of the roof for pumping water into the fibrous material wherein the fresh air is cooled to produce cooled air;

one or more fans to draw the cooled air first into the building through one or more slots in a plenum chamber and then out of the building, the one or more fans located above the pens to cool and ventilate.

27. The apparatus as recited in claim 26 wherein the one or more fans draws foul air from one or more pens out of the building.

28. The apparatus as recited in claim 27 wherein the one or more pens have partitions which are solid.

29. The apparatus as recited in claim 26 wherein a pipe from said water tanks can convey water by gravity flow to a location accessible by pigs within said pens.

30. An apparatus for managing livestock waste on-site comprising:

a pump for pumping livestock waste;

fibrous material within said apparatus for combining with the livestock waste;

one or more blending conveyors for mixing and transporting the fibrous material and livestock waste to a composting site, without diluting the pig waste or separating the pig waste into different components.

31. The apparatus for managing livestock waste as recited in claim 30 further comprising one or more gutter systems for collecting livestock waste.

32. The apparatus for managing livestock waste as recited in claim 31, further comprising means for mixing gas with the fibrous material and livestock waste as it is being transported to the composting site.

33. A kit having instructions and materials for assembling and operating a building containing a waste management system comprising:

a first gutter system for collecting pig waste;

a second gutter system proximate to the first gutter system to hold the pig waste and fibrous material; and at least one blending conveyor which may be attached with a second gutter system included in the kit for mixing and moving the pig waste and fibrous material so that composting can occur, to produce an end product which is usefull in gardening and agriculture.

34. The kit as recited in claim 33 further comprising fiberglass or aluminum slats to be assembled on supports such that space exists between the slats defining openings through which waste material can flow into the first gutter system.

35. The kit as recited in claim 34 further comprising four partitions and a floor which may be assembled to form a pen with four sides and a floor, said floor comprising fiberglass deckplate and fiberglass or aluminum slats which can be covered in specific locations with the fiberglass deckplate.

36. The kit as recited in claim 35 further including instructions and materials for assembling and operating an adjustable and removable farrowing stall, a removable pig hover and a fiberglass feeding area.

37. The kit as recited in claim 34 further including instructions and materials for assembling and operating a jet stream ventilation system having a cooling room and a plenum chamber, wherein said plenum chamber has slots.

* * * * *